(12) United States Patent
Kabashima et al.

(10) Patent No.: US 7,797,444 B2
(45) Date of Patent: Sep. 14, 2010

(54) DATA TRANSFER APPARATUS AND DATA TRANSFER SYSTEM

(75) Inventors: Keisuke Kabashima, Osaka (JP); Michihiro Aoki, Tokyo (JP); Takashi Kurimoto, Tokyo (JP); Takashi Miyamura, Tokyo (JP); Masahiro Goshima, Tokyo (JP); Nobuaki Matsuura, Sayama (JP); Shigeo Urushidani, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 930 days.

(21) Appl. No.: 10/524,613

(22) PCT Filed: Feb. 2, 2004

(86) PCT No.: PCT/JP2004/000986

§ 371 (c)(1),
(2), (4) Date: Feb. 16, 2005

(87) PCT Pub. No.: WO2004/071034

PCT Pub. Date: Aug. 19, 2004

(65) Prior Publication Data

US 2006/0168316 A1    Jul. 27, 2006

(30) Foreign Application Priority Data

Feb. 3, 2003   (JP) ............................. 2003-025719
Mar. 19, 2003  (JP) ............................. 2003-074977

(51) Int. Cl.
*G06F 15/16* (2006.01)

(52) U.S. Cl. ................. 709/238; 709/223; 709/226; 709/227

(58) Field of Classification Search ........... 709/223, 709/226, 227, 228
See application file for complete search history.

(56) References Cited

U.S. PATENT DOCUMENTS 4,873,681 A    10/1989    Arthurs et al.

(Continued)

FOREIGN PATENT DOCUMENTS

CN    1394045 A    1/2003

(Continued)

OTHER PUBLICATIONS

"The Nikkei Network," Nikkei BP Publishers, Sep. 22, 2002, No. 30, p. 173, Japan.

(Continued)

*Primary Examiner*—Vivek Srivastava
*Assistant Examiner*—Adnan Mirza
(74) *Attorney, Agent, or Firm*—Harness, Dickey & Pierce, P.L.C.

(57) ABSTRACT

A data transfer apparatus and a data transfer system are provided that can reduce the cost of installing communication equipment compatible with each of several dissimilar communication protocols in one exchange office and can reduce the cost of constructing the network. The data transfer apparatus includes a data reception device (110) that receives packets that comply with dissimilar communication protocols from upstream data transfer apparatuses (51, 52, and 53); a content data extraction device (120) that extracts content data included in the packets; a line selection information storage device (130) that stores the line selection information for selecting communication lines that comply with dissimilar communication protocols; a line selection device (140) that selects the communication line compatible with content data based on the line selection information; and a data transfer device (150) that transfers data to downstream data transfer apparatuses (61, 62, and 63) that are connected to the communication line that has been selected by the line selection device.

18 Claims, 15 Drawing Sheets

U.S. PATENT DOCUMENTS

| | | | |
|---|---|---|---|
| 4,993,018 | A | 2/1991 | Hajikano et al. |
| 5,353,145 | A | 10/1994 | Le Coquil et al. |
| 5,563,878 | A | 10/1996 | Blakeley et al. |
| 5,588,003 | A | 12/1996 | Ohba et al. |
| 6,631,416 | B2 * | 10/2003 | Bendinelli et al. .......... 709/227 |
| 7,106,747 | B2 * | 9/2006 | Donaghey .............. 370/395.52 |
| 2001/0002192 | A1 | 5/2001 | Fujita |
| 2001/0050914 | A1 | 12/2001 | Akahane et al. |
| 2002/0003803 | A1 | 1/2002 | Kametani |
| 2003/0026271 | A1 | 2/2003 | Erb et al. |
| 2004/0213248 | A1 | 10/2004 | Okuda et al. |

FOREIGN PATENT DOCUMENTS

| | | |
|---|---|---|
| EP | 0 512 495 A2 | 11/1992 |
| JP | 62-072252 | 4/1987 |
| JP | 01-500634 | 3/1989 |
| JP | 4-196666 A | 7/1992 |
| JP | 06-301650 | 10/1994 |
| JP | 6-334660 | 12/1994 |
| JP | 8-8974 | 1/1996 |
| JP | 08-292908 | 11/1996 |
| JP | 9-331348 | 12/1997 |
| JP | 11-017738 A | 1/1999 |
| JP | 2001-053803 | 2/2001 |
| JP | 2001-156800 | 6/2001 |
| JP | 2001-251253 | 9/2001 |
| JP | 2001-345864 A | 12/2001 |
| JP | 2001-358777 A | 12/2001 |
| JP | 2002-044126 | 2/2002 |
| JP | 2002-077243 | 3/2002 |
| JP | 2002-335298 A | 11/2002 |
| JP | 2002-368787 | 12/2002 |
| WO | 02/098064 A1 | 12/2002 |

OTHER PUBLICATIONS

"Making the Internet High Grade: Fujitsu IP Network Solutions," Nikkei Communications, Nikkei BP Publishers, Nikkei Business Publications, Inc., Dec. 4, 2000, No. 331, pp. 132-141, Japan.

First Office Action issued Dec. 14, 2007 on counterpart Chinese Patent Application No. 200480000765.X.

* cited by examiner

FIG. 14

| ADDRESS PREFIX | SWITCHING LABEL |
|---|---|
| 123. 456 | tag1, tag2, tag3 |
| 124. 568 | tag4, tag2 |
|  |  |

DATA TRANSFER APPARATUS AND DATA TRANSFER SYSTEM

TECHNICAL FIELD

The present invention relates to a data transfer apparatus and data transfer system that transfer data, and in particular relates to a data transfer apparatus and a data transfer system that comply with the communication protocols that relate to networks. In addition, the present invention relates in particular to apparatuses (below referred to as router apparatuses) and network systems in which the switching of packets (below, referred to as IP packets) among data transfer apparatuses is carried out in compliance with Internet Protocol, and, when the network is constructed by a plurality of router apparatuses, relates to an advantageous technology that is applied to these router apparatuses.

BACKGROUND ART

As an example of a conventional data transfer apparatus, a data transfer apparatus positioned at the edge of a network is known that allocates a different light wavelength for each destination address contained in the IP packet, time division multiplexes the allocated light wavelengths, and transmits the optical signal that comprises the data by using the time division multiplexed light wavelength. Thereby, this data transfer apparatus transmits a large amount of data at a high speed and efficiency. (For example, refer to Japanese Unexamined Patent Application, First Publication, No. 2001-251253, paragraph 33, paragraph 43, and FIG. 10.)

As another example of a conventional data transfer apparatus, a data transfer apparatus is known in which the routing process for IP packets in which a path is determined when data is transferred based on the IP packet is integrated with the routing process for the light wavelength in which the route and the light wavelength are determined when the optical signal that comprises the data is transmitted based on the light wavelengths. (For example, refer to Japanese Unexamined Patent Application, First Publication, No. 2001-53803, paragraphs 17 and 18, and FIG. 1.)

However, currently there is the problem that a high cost for communication equipment is incurred when placing in one exchange office the communication equipment that is compatible with each of the different communication protocols related to the tunneling technologies for transferring data efficiently in accordance with the various services that provide rapidly spreading VPN (virtual private network) and VLAN (virtual local area network) and the like.

In addition, in recent years large-scale networks have been constructed by connecting the various networks operated by such different groups as industry, communication carriers and the like. Because large-scale networks are constructed by using only the high cost conventional data transfer apparatuses described above, there is the problem that the costs incurred to construct the network are high.

In contrast, conventionally MPLS (MultiProtocol Label Switching) is known as one transfer technology for IP (Internet Protocol) packets.

In networks constructed by router apparatuses that are compatible with MPLS, a label associated with the destination address of the IP packed is attached to the IP packet in an edge router apparatus. Then, a label (output label) added to a transmitted IP packet is found based on the label (input label) of the received IP packet in a core router. Finally, after swapping the label, the IP packet is transmitted to the next router apparatus, and a path is formed using the label. Note that an edge router is a router apparatus connected to a network and a terminal that are not compatible with MPLS and another MPLS network or the like (an external network), and a core router is a router apparatus that carries out the transfer of packets in the MPLS network.

In addition, a label hierarchy is created, and by referring to the labels of the same layer in the network, labeled IP packets are tunneled within the network (refer, for example, to Japanese Unexamined Patent Application, First Publication, No. 2002-44126).

However, in this type of conventional router apparatus, at the same time that the attachment and swapping of labels is carried out, it is necessary to add a switching tag to the packet in order to switch the incoming packet within the router device. This switching tag also requires searching by the destination address or the label, and thus there is the problem that the processing load increases. In addition, the cost of the router device increases due to the increase in the processing load, and thus there is also the problem that the cost of constructing the network becomes high.

Searching by destination address and adding a switching tag for switching within a router apparatus is similar to the normal transfer of IP packets.

DISCLOSURE OF INVENTION

In order to solve the problems of the conventional technology described above, it is an object of the present invention to provide a data transfer apparatus, a data transfer system, a router apparatus, and a network system that allow a reduction in the network cost.

More concretely, it is an object of the present invention to provide a data transfer apparatus and a data transfer system that reduce the cost of installing in one exchange office communication equipment that is compatible with each of the various dissimilar communication protocols and reduce the cost for constructing the network.

In addition, it is an object of the present invention to provide a router apparatus and network system that raise the packet transfer efficiency by reducing the processing load, reducing the cost of the router apparatus, and thereby reduces the cost for constructing the network system, by affixing switching tags to packets in the transfer path order and switching the packets within the router apparatuses in sequence according to the switching tags.

These and other objects and novel characteristics of the present invention will become clear by the disclosures of this specification and the attached drawings.

Among the inventions disclosed in the present application, the summary of a representative invention can be simply explained as follows.

The data transfer apparatus of the present invention is a data transfer apparatus that receives data from an adjacent upstream data transfer apparatus and transfers the received data to an adjacent downstream data transfer apparatus, and comprises a data reception device that receives packets that comply to dissimilar communication protocols from the upstream data transfer apparatus; a content data extraction device that extracts content data included in a packet received by the data reception device; a line selection information storage device in which line selection information for selecting one of communication lines that comply with dissimilar communication protocols is stored; a line selection device that selects a communication line corresponding to the content data extracted by the content data extraction device based on the line selection information stored in the line selection information storage device; and a data transfer device that transfers the packet to the downstream data transfer apparatus that is connected to the communication line that has been selected by the line selection device.

According to this structure, communication lines that comply with dissimilar communication protocols are selected according to the content data included in the packets from an upstream data transfer apparatus that comply with dissimilar communication protocols, and the data is transferred to a downstream data transfer apparatus connected to the selected communication line. Thereby, it is possible to reduce the cost for installing in one exchange office the communication equipment compatible with each of the various dissimilar communication protocols. In addition, because the packets are transferred based on line selection information, it is possible to select the transfer path by which transfers the packets will be transferred according to network design that is carried out by the network administrators.

In addition, the data transfer apparatus of the present invention is a data transfer apparatus that receives data from an adjacent upstream data transfer apparatus and transfers the received data to an adjacent downstream data transfer apparatus, and comprises a data reception device that receives packets that comply to dissimilar communication protocols from the upstream data transfer apparatus; and a destination information extraction device that extracts destination information that represents a destination included in a packet that has been received by the data reception device; a destination selection information storage device that stores destination selection information for selecting a communication line; a destination line selection device that selects a communication line corresponding to the destination information that has been extracted by the destination information extraction device based on the destination selection information that is stored in the destination information storage device; a content data extraction device that extracts content data included in a packet received by the date reception device when a plurality of communication lines have been selected by the destination selection device; a line selection information storage device that stores line selection information for selecting one of the communication lines that comply with dissimilar communication protocols; a line selection device that selects the communication line that has been selected by the destination line selection device or selects a communication line corresponding to the content data extracted by the content data extraction device based on the line selection information stored in the line selection information storage device; and a data transfer apparatus that transfers the packets to the downstream data transfer apparatus connected to the communication line that has been selected by the line selection device.

According to this structure, even with a network configuration in which there are a plurality of transfer paths based on the destination information included in the packet, because the packets are transferred based on line selection information, it is possible to select the transfer path for a packet according to the network design carried out by network administrators or the like.

In addition, the data transfer apparatus of the present invention can further provide a packet analyzing device that analyzes the packet received by the data reception device when the destination address information extracted by the destination information extraction device represents its own address and a line selection information updating device that updates the line selection information stored in the line selection information storage device based on information that has been analyzed by the packet analyzing device.

According to this structure, for example, because the line selection information is updated according to predetermined packets transmitted from the server and the user terminal, it is possible to select the transfer path for the packet automatically in response to the requests form the server and the user terminal.

In addition, the data transfer apparatus of the present invention can further provide a line selection information input device that inputs the line selection information, and the line selection information storage device can store the line selection information input from the line selection information input device.

According to this structure, because the line selection information is input from an administrative terminal, it is possible to update the line selection information according to the input from the administrative terminal.

In addition, in the data transfer apparatus of the present invention, the content data can include virtual private network information that represents a virtual private network.

According to this structure, because packets are transferred according to the virtual private network information that represents a virtual private network, it is possible to select a transfer path by which the packets will be transferred according to the services that provide virtual private networks to the users.

This virtual private network information can include VLAN identifiers that are stipulated in IEEE 802.1Q. Thereby, because packets are transferred according to VLAN identifiers that are stipulated by IEEE 802.1Q, it is possible to select the transfer path by which the packets are transferred according to services that provide VLAN to the users.

This virtual private network information can include VPN labels that represent the VPN stipulated by RFC 2547. Thereby, because the packets are transferred according to VPN labels that represent a VPN that is stipulated by RFC 2547, it is possible to select the transfer path by which the packets are transferred according to services that provide MPLS-VPN to the users.

This virtual private network information can include VC labels that represent the virtual circuit added to the protocol data unit. Thereby, because packets are transferred according to VC labels that represent virtual circuits added to the protocol data unit, it is possible, for example, to select the transfer path by which the packets are transferred according to services that provide VPN that is realized in layer 2 to the users.

In addition, in the data transfer apparatus of the present invention, the content data can include logical line information that represents a logical line.

According to this structure, because the packets are transferred according to the logical line information that represents logical lines, it is possible to select a transfer path by which the packets are transferred according to services that provide logical lines to the users.

In addition, the data transfer system of the present invention is a data transfer system in which a data transfer apparatus described above transfers data to another data transfer apparatus described above using a relay method.

According to this structure, because a network construction becomes possible that does not use only expensive conventional data transfer apparatuses, it is possible to reduce the cost for constructing the network.

An edge router apparatus according to a first aspect of the present invention is an edge router apparatus that is disposed at a connection between a network and the outside of the network, receives a packet from the outside of the network and transfers the packet to a router apparatus within the network, or transmits a packet from a router apparatus within the network to the outside of the network, and comprises: a switching information calculation device that obtains switching information for switching the received packet at each router apparatus positioned along a transfer path of the received packet within the network based on a destination address of the packet received from the outside of the network; and a transmitting device that affixes to the received packet the switching information obtained by the switching information calculation device in a transfer path order, and transmits the received packet to which the switching information has been affixed to a transfer destination router apparatus.

According to this structure, in the edge router apparatus, at each router apparatus positioned along the transfer path of the received packet in the network, the switching information for switching the received packet is affixed to the received packet in the transfer path order.

Therefore, in each of the router apparatuses, because it is possible to carry out switching by using switching information that has been affixed to the packet, in the core router, it is not necessary to carry out a search of the switching information, it is possible to reduce the processing load, and it is possible to increase the transfer efficiency.

In addition to the structure of the edge router apparatus of the first aspect described above, the edge router apparatus according to a second aspect of the invention further provides a routing table that stores switching information for switching the packet at each router apparatus positioned along a transfer path of the packet in the network up to the other network for each network address of the other network, uses a destination address of the packet received from the other network, searches the routing table, and obtains the switching information for switching the received packet at each router apparatus positioned along the transfer path of the received packet within the network up to a network specified by the destination address. According to this structure, in each of the router apparatuses positioned along the transfer path of the received packet in the network, the switching information for switching packets is stored as a routing table, and the packets are transferred by using the path set in the routing table. Therefore, it is possible to find the switching information simply, and it becomes possible to reduce the processing load. As a result, it is possible to reduce the cost of the network that includes router apparatuses.

In addition to the structure of the edge router apparatus of the second aspect described above, an edge router apparatus according to a third aspect of the present invention can provide a data input apparatus for setting the switching information in the routing table. According to this structure, the routing table can be set by the data input apparatus. Thereby, it becomes possible to carry out the setting of the routing table simply. As a result, it is possible to reduce the cost of the network that includes router apparatuses.

The core router apparatus of the present invention is a core apparatus that receives and transfers a packet to which switching information has been affixed for switching the packet, and switches the received packet by the core router apparatus itself based on the switching information attached to the received packet, and transmits a packet that has had the switching information used by the core router apparatus itself deleted.

According to this structure, packets are switched based on the switching information affixed to the packet, and the packets are transferred after the switching information that has been used has been deleted.

The network system according to a first aspect of the present invention provides the edge router apparatus according to the first aspect and the core router apparatus described above.

According to this structure, in the edge router apparatus, at each of the router apparatuses positioned along the transfer path of the received packet in the network, the switching information for switching the packets is affixed in the transfer path order, and in the core router apparatus, the switching of the packet is carried out using the switching information affixed to the packet, and the packet is transferred after the used switching information has been deleted in order.

Therefore, in the edge router apparatus, the packets are switched and transferred depending on the affixed switching information.

The network system according to a second aspect of the present invention provides the edge router apparatus according to the second aspect and the core router apparatus described above.

According to this structure, in the edge router apparatus, at each of the router apparatuses positioned along the transfer path of the received packet in the network, by using the routing table, switching information for switching the received packet is affixed to the received packet, and in the core router apparatus, switching of the packets is carried out by using the switching information affixed to the packet, and the packets are transferred after the used switching information is deleted in order. Therefore, packets are switched and transferred according to the switching information in the routing table that is stored in the edge router apparatus.

In addition to the structure of the network system described above, the edge router apparatus can provide a data input apparatus for setting the switching information in the routing table. According to this structure, the routing table can be set by using the data input apparatus. Thereby, it becomes possible to carry out the setting of the routing table simply.

In addition to the structure of the network system described above, as path information, the edge router apparatus reports to a core router apparatus or another edge router apparatus connected to the edge router apparatus itself a network address of the other network connected to the edge router apparatus itself and switching information to the other network, and the core router apparatus that has received this path information affixes to the received path information the switching information to a core router apparatus or an edge router apparatus that transmits this path information. The path information that has had the switching information affixed is reported to core router apparatuses and edge router apparatuses other than the edge router apparatus or the core router apparatus that have transmitted this path information among core router apparatuses and edge router apparatuses connected to the core router apparatus itself. The edge router apparatus that has received this path information can create the routing table by using this received path information.

According to this structure, the packets follow the path from one edge router apparatus to another edge router apparatus in reverse order while the switching information is sequentially added to the packets, and thereby the switching information is reported to another edge router and a routing table is created. In this manner, by creating a routing table by reporting the information between router apparatuses, it becomes possible to set the routing table automatically.

BRIEF DESCRIPTION OF DRAWINGS

FIG. 14 is a drawing that shows the content of the routing table stored in the data memory unit shown in FIG. 12.

BEST MODE FOR CARRYING OUT THE INVENTION

Figure 1:
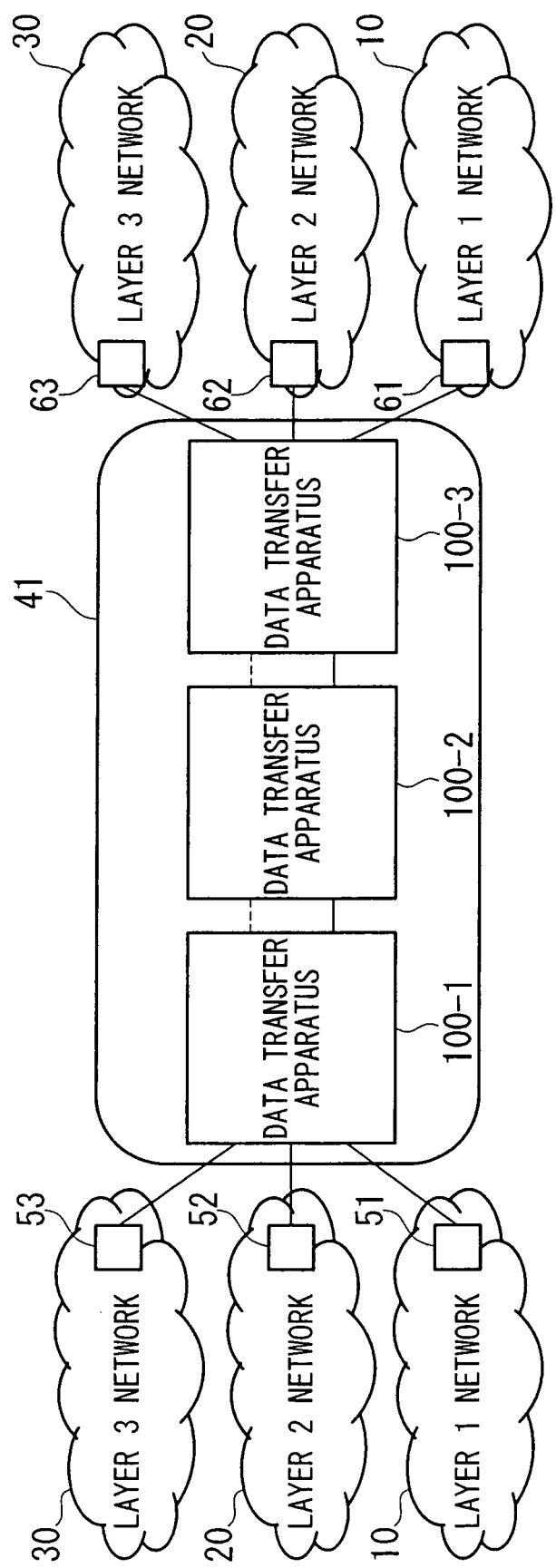
FIG. 1 is a block diagram showing the system structure of the data transfer system of the first embodiment of the present invention.

Below, embodiments of the present invention will be explained with reference to the figures.

Note that in all the figures for explaining the embodiments, parts having the same function are denoted by the same reference numeral, and repetition of the explanation thereof has been omitted.

First Embodiment

FIG. 1 is a block diagram showing the system structure of the data transfer system of the first embodiment of the present invention.

As shown in FIG. 1, although the data transfer system 41 of the present embodiment is formed so as to include a plurality of data transfer apparatuses 100, the data transfer device 41 can be formed by only one data transfer apparatus 100. In addition, the data transfer system 41 can form a backbone network, and the backbone network connects to external networks including a layer 1 network 10, a layer 2 network 20, and a layer 3 network 30.

The layer 1 network 10 is formed so as to include the upstream data transfer apparatus 51 and the downstream data transfer apparatus 61.

Note that the term "upstream data transfer apparatus" denotes a data transfer apparatus that transmits received data when viewed from the data transfer apparatus that receives data. The term "downstream data transfer apparatus" denotes the data transfer apparatus that receives transmitted data when viewed from the data transfer apparatus that transmits data.

The upstream data transfer apparatus 51 and the downstream data transfer apparatus 61 comply with well-known communication protocols such as WDM (wavelength division multiplexing), determine a path and a light wavelength when transmitting an optical signal that comprises data based on the light wavelengths, and transmit the optical signal based on the determined path and light wavelength.

In addition, data can be transferred based on packets that comply with well-known protocols such as SDH (Synchronous Digital Hierarchy) and ATM (Asynchronous Transfer Mode). In the upstream data transfer apparatus 51 and the downstream data transfer apparatus 61, these communication protocols can be mixed, and data can be transferred based on packets that comply with their respective communication protocols.

The layer 2 network 20 is formed so as to include an upstream data transfer apparatus 52 and a downstream data transfer apparatus 62.

The upstream data transfer apparatus 52 and the downstream data transfer apparatus 62 transfer data based on packets that comply with well-known communication protocols such as Ethernet.

In addition, the upstream data transfer apparatus 52 and the downstream data transfer apparatus 62 can transfer data based on packets that comply with well-known communication protocols such as MPLS (MultiProtocol Label Switching). In the upstream data transfer apparatus 52 and the downstream data transfer apparatus 62, these communication protocols can be mixed, and data can be transferred based on packets that comply with their respective communication protocols.

The layer 3 network 30 is formed so as to include an upstream data transfer apparatus 53 and a downstream data transfer apparatus 63.

The upstream data transfer apparatus 53 and the downstream data transfer apparatus 63 determine the path when data is transferred based on packets (below, referred to as IP packets) that comply with the Internet Protocol, and transmit the IP packets on the determined path.

Figure 2:
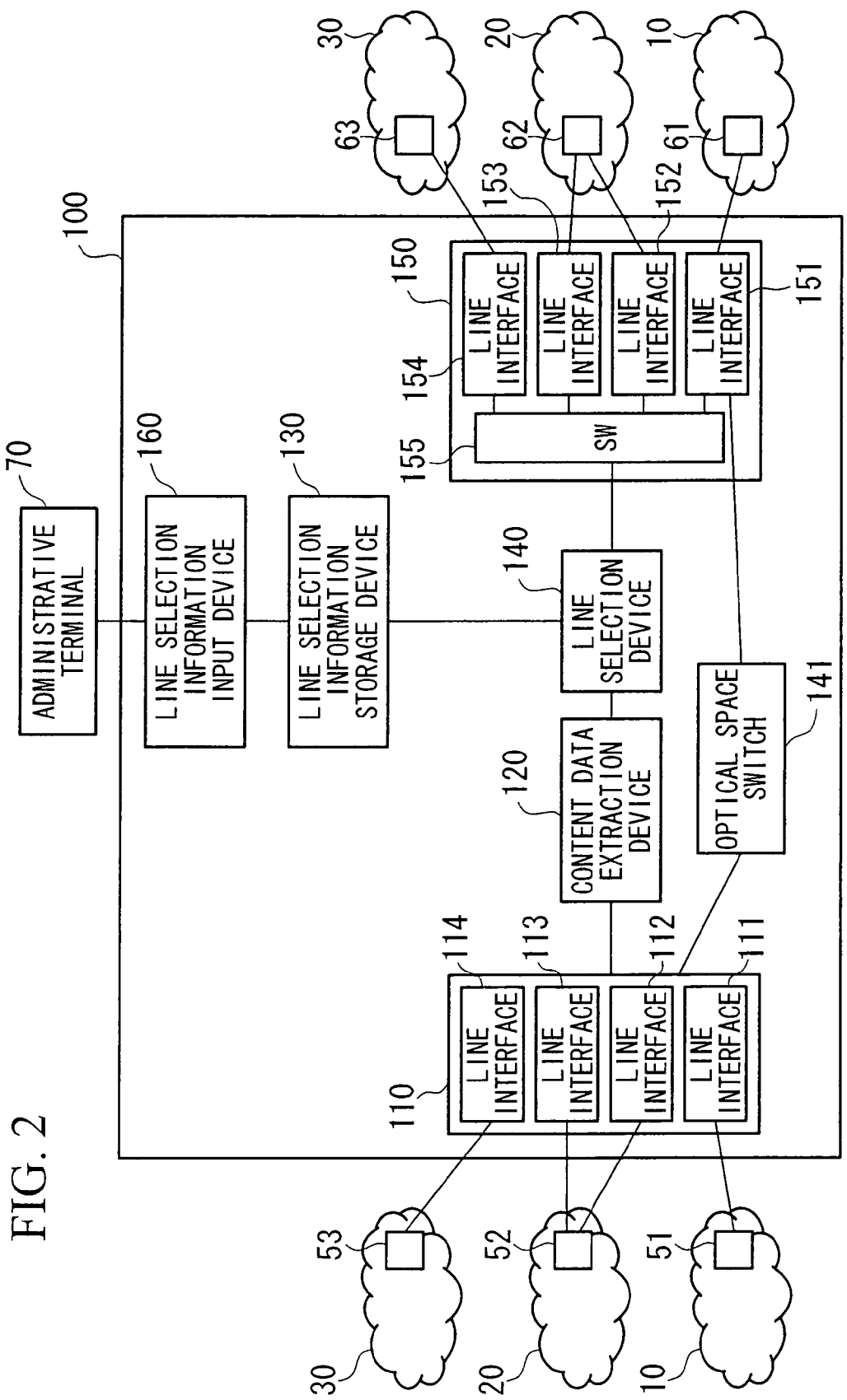
FIG. 2 is a block diagram showing the schematic structure of the data transfer apparatus of the first embodiment of the present invention.

FIG. 2 is a block diagram showing the schematic structure of the data transfer apparatus in the first embodiment of the present invention.

As shown in FIG. 2, the data transfer apparatus 100 of the present embodiment provides a data reception device 110, a content data extraction device 120, a line selection information storage device 130, a line selection device 140, an optical space switch 141, a data transfer device 150, and a line selection information input device 160.

The data reception device 110 includes a line interface 111 that receives an optical signal transmitted from the upstream data transfer apparatus 51 that forms the layer 1 network 10; a line interface 112 that receives packets that has been transmitted from the upstream data transfer apparatus 52 that forms the layer 2 network 20 and comply with the Ethernet; a line interface 113 receives packets that has been transmitted from the upstream data transfer apparatus 52 that forms the layer 2 network 20 and comply with MPLS; and a line interface 114 that receives IP packets transmitted from the upstream data transfer apparatus 53 that forms the layer 3 network.

In addition, the line interface 111 transmits a predetermined optical signal to the optical space switch 141 based on the light wavelength that forms the received optical signal. Note that in FIG. 2, although four line interfaces are shown, the number of line interfaces is not limited to four.

The data reception device 110 receives data that comply with dissimilar communication protocols via the line interface 111, the line interface 112, the line interface 113, and the line interface 114, and the packets comprising the received data are output to the content data extraction device 120.

The packets output from the data reception device 110 are input into the content data extraction device 120, the content data extraction device 120 extracts the content data that is included in the input packet, and the extracted content data or a packet corresponding to the extracted content data is output to the line selection device 140.

For example, virtual private network information that represents a virtual private network, or logical line information that represents a logical line such as an LSP (Label Switched Path) in MPLS (MultiProtocol Label Switching) or a VP (Virtual Path) and VC (Virtual Channel) in ATM (Asynchronous Transfer Mode) are included in the content data.

The line selection information storage device 130 stores the line selection information for selecting the communication lines that comply with dissimilar communication protocols.

Line selection information that is output from the line selection information input device 160 can be input into this line selection information storage device 130, and the line selection information storage device 130 can store the input line selection information.

The line selection information includes, for example, the content data included in the packet and information that represents the association between the identifiers of the line interfaces for transmitting packets.

Figure 10A:
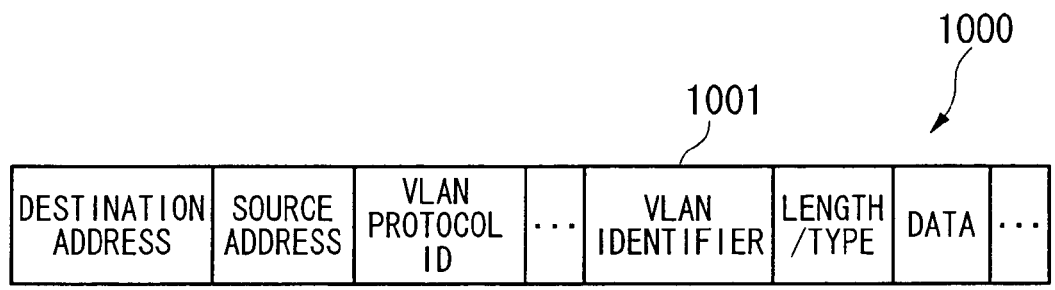
FIG. 10A to FIG. 10C are diagrams showing the packet structure that shows the network information for a virtual private network.
Figure 10B:
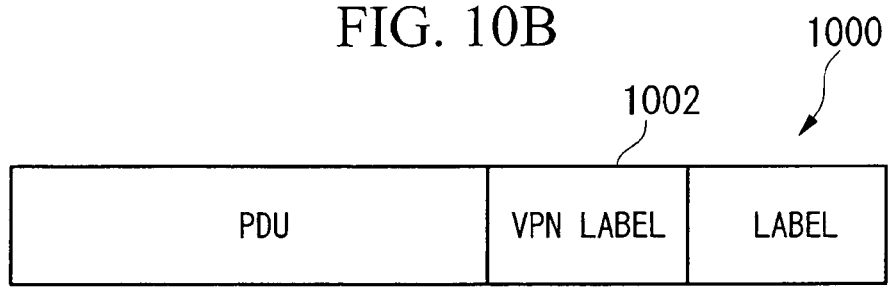
Figure 10C:
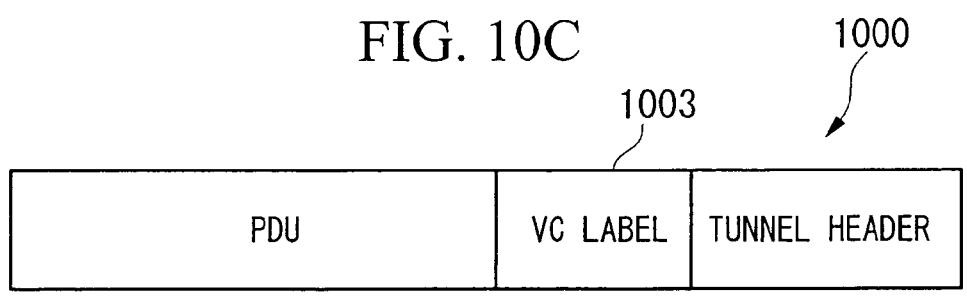

Note that virtual private network information is included in the content data, and FIG. 10A to FIG. 10C are packet structure diagrams showing the virtual private network information.

The virtual private network information included in the packet 1000 includes, for example, as shown in FIG. 10A, a VLAN identifier 1001 that is stipulated in IEEE 802.1Q (Institute of Electrical and Electronics Engineers); as shown in FIG. 10B, a VPN label 1002 that represents the VPN (virtual private network) stipulated in RFC 2547 (Request for Comments); and as shown in FIG. 10C, a VC label 1003 that represents a virtual circuit (VC) affixed to a protocol data unit (PDU).

Note that the PDU shown in FIG. 10C includes data stipulated in IEEE 802.3 and data stipulated in IEEE 802.1Q, and the tunneling header includes a shim header and the like.

Here, Table 1 shows an example of the line selection information that represents the association between the virtual private network information and the identifiers of the line interfaces. Note that the line interfaces comprises a communication line.

TABLE 1

| Content data (virtual private network information) | Line interface |
|---|---|
| VLAN identifier: from 10 to 20 | Line interface #151 |
| VPN label: from 101 to 200 | Line interface #152 |
| VC label: from 101 to 200 | Line interface #153 |
| Other packets | Line interface #154 |

In addition, the logical line information that represents the logical line is included in the content data, and the VP (Virtual Path), the VC (Virtual Channel), and the LSP (Label Switched Path), which is transferred based on the label that forms the shim header, are included in the logical line.

Here, Table 2 shows an example of the line selection information that represents the association between the logical line information and the identifiers of the line interfaces.

TABLE 2

| Content data (logical line information) | Line interface |
|---|---|
| Label that forms the shim header: from 1 to 5 | Line interface #151 |
| VP: from 10 to 20 | Line interface #152 |
| VP = 1 and VC: from 101 to 200 | Line interface #153 |
| Other packets | Line interface #154 |

The content data and the packets output from the content data extraction device 120 are input into the line selection device 140.

The line selection device 140 selects the line interface corresponding to the input content data based on the line selection information stored in the line selection information storage device 130, and the line selection identifiers that represent the selected line interface and the input packets are output to the data transfer device 150.

For example, as shown in Table 1, in the case that the input is a packet 1000 in which the value represented by the VLAN identifier 1001 is from 10 to 20, the line selection device 140 outputs the selected line identifier that represents the line interface 151 and the packet 1000 to the data transfer device 150.

In addition, in the case that the input is a packet 1000 in which the value represented by the VPN label 1002 is from 101 to 200, the line selection device 140 outputs the selected line identifier that represents the line interface 152 and the packet 1000 to the data transfer device 150.

In addition, in the case that the input is a packet 1000 in which the value represented by the VC label 1003 is from 101 to 200, the line selection device 140 outputs the selected line identifier that represents the line interface 153 and the packet 1000 to the data transfer device 150.

Furthermore, in the case that the input is a packet in which the value represented by the VLAN identifier 1001 outside the range from 10 to 20, a packet in which the value represented by the VPN label 1002 is outside the range from 101 to 200, a packet in which the value represented by the VC label 1003 is outside the range from 101 to 200, or a packet 1000 that does not include virtual private network information in the content data, the line selection device 140 outputs the selected line identifier representing the line interface 154 and the packet 1000 to the data transfer device 150.

In addition, as shown in Table 2, in the case that the input is a packet in which the value represented by the label that forms the shim header is from 1 to 5, the line selection device 140 outputs the selected line identifier representing the line interface 151 and the packet to the data transfer device 150.

In addition, in the case that the input is a cell in which the value represented by a VP is from 10 to 20, the line selection device 140 outputs a selected line identifier that represents the line interface 152 and the cell to the data transfer device 150. Note that according to the regulations of ATM, a packet that is formed by a 53 octets is referred to as a cell.

In addition, in the case that the input is a cell in which the value represented by the VP is 1 and the value represented by the VC is from 101 to 200, the line selection device 140 outputs a selected line identifier that represents the line interface 153 and the cell to the data transfer device 150.

Furthermore, in the case that the input is a packet in which the value represented by the label that forms the shim header is outside a range from 1 to 5, the cell in which the value represented by the VP is outside a range from 10 to 20, a cell in which the value of VP is 1 and the value represented by VC is outside a range from 101 to 200, or a packet that does not include logical line information in the content data, the line selection device 140 outputs the selected line identifier that represents the line interface 154 and the packet to the data transfer device 150.

The identifier of the line interface and packet output from the line selection device 140 are input into the data transfer device 150, and the data transfer device 150 transfers the data including of the packets to the downstream data transfer apparatus 61, the downstream data transfer apparatus 62, or the downstream data transfer apparatus 63 that is connected to the communication line indicated by the input selected line identifier.

The data transfer device 150 includes a switching unit 155, a line interface 151, a line interface 152, a line interface 153, and a line interface 154.

The selected line identifier and the packet output from the line selection device 140 are input into the switching unit 155, and the switching unit 155 outputs the packet to communication line indicated by the input selected line identifier, that is, any one among the line interfaces.

The packets output from the switching unit 155 are input into the line interface 151, and the line interface 151 transmits the optical signal that forms the data including the input packets to the downstream data transfer apparatus 61.

In addition, the line interface 151 transmits the optical signal transmitted by the optical space switch 141 to the downstream data transfer apparatus 61. Note that in FIG. 2, although four line interfaces are illustrated, the number of line interfaces is not limited to four.

The line interface 152 inputs the packets output from the switching unit 155, and the line interface 152 transmits the input packets to the downstream data transfer apparatus 62 in compliance with Ethernet.

The line interface 153 inputs the packets output from the switching unit 155, and the line interface 153 transmits the input packets to the downstream data transfer apparatus 63 in compliance with MPLS.

The packets output from the switching unit 155 are input into the line interface 154, and the line interface 154 converts the input packets into IP packets and transmits the converted IP packets to the downstream data transfer apparatus 64.

The optical space switch 141 receives the optical signal transmitted by the line interface 111, converts the light wavelength that forms the received optical signal, and transmits the optical signal including the converted light wavelength to the line interface 151.

The line selection information from an administrative terminal 70 is input into the line selection information input device 160, and the input line selection information is output to the line selection information storage device 130. Note that according to the present invention, the line selection information input device 160 can input the line selection information from the administrative terminal 70 via an administrative network that is administered by a communication carrier or the like.

Below, the operation of the data transfer apparatus according to the first embodiment of the present invention will be explained with reference to FIG. 3.

Figure 3:
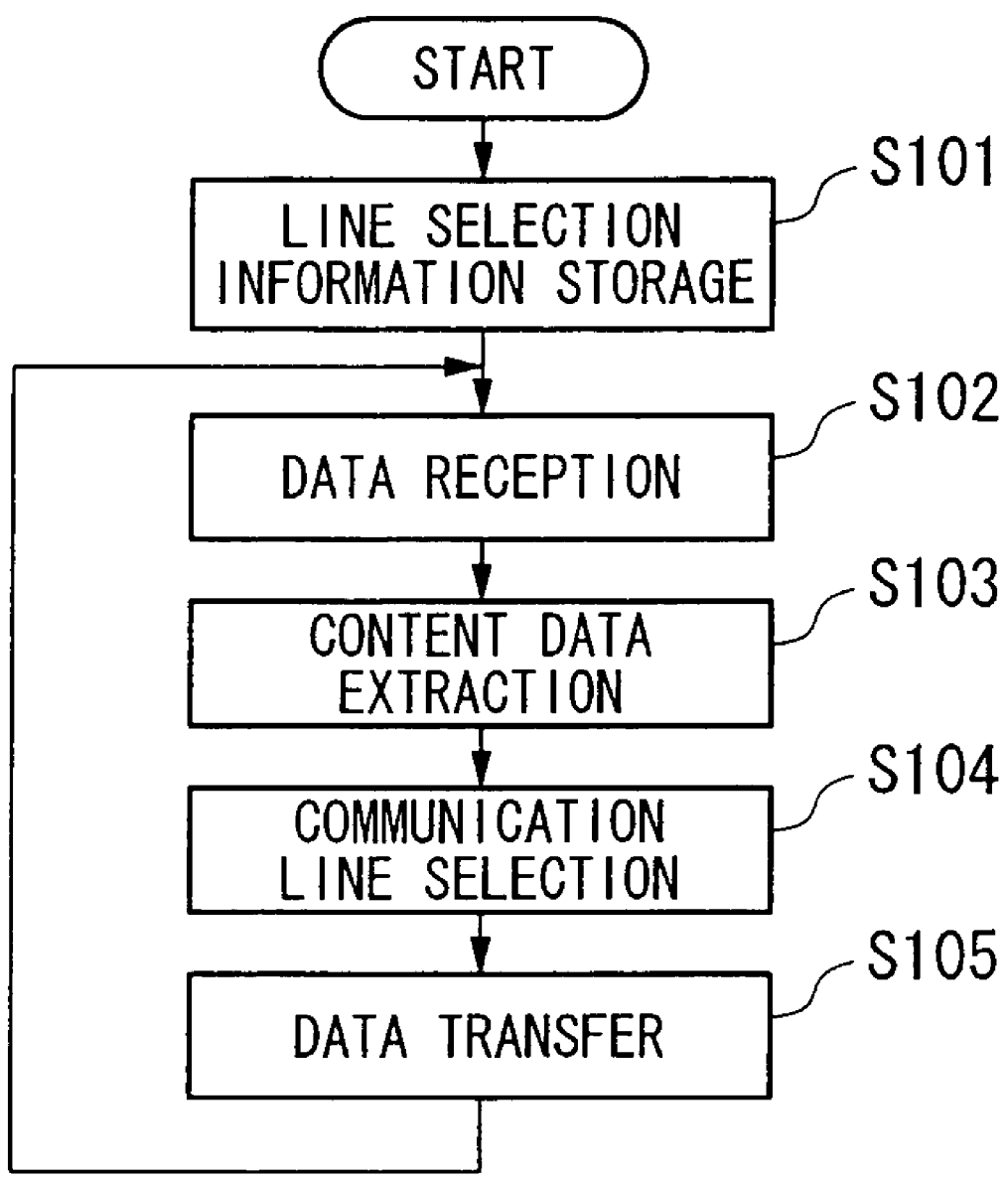
FIG. 3 is a flowchart showing the operation of the data transfer apparatus of the first embodiment of the present invention.

FIG. 3 is a flowchart showing the operation of the data transfer apparatus of the first embodiment of the present invention.

First, the line selection information is input into the line selection information input device 160 via the administrative network from the administrative terminal 70, and stored in the line selection information storage device 130 (step S 101).

In contrast, packets formed by data complying with dissimilar communication protocols are received by the data reception device 110 via the line interface 111, line interface 112, line interface 113, and the line interface 114 (step S 102).

When the packets are input into the content data extraction device 120, the content data included in the packet is extracted by the content data extraction device 120 (step S 103).

Next, when the packets have been input into the line selection device 140, the selected line identifier that indicates the line interface associated with the content data is selected by the line selection device 140 based on the line selection information stored in the line selection information storage device 130 (step S 104).

Next, when the packets are input into the data transfer device 150, the data including the packets is output to the communication line indicated by the selected line identifier, that is, any one among the line interfaces, by the switching unit 155, and then transferred to a downstream data transfer apparatus (step S 105).

Subsequently, when the data is received by the data transfer apparatus 100, the steps from step S 102 to step S 105 are repeated.

Note that in the data transfer system 41 shown in FIG. 1, the data that is transmitted to the data transfer apparatus 100-1 from the upstream data transfer apparatus 51, the upstream data transfer device 52, and the upstream data transfer apparatus 53 is transferred by using a relay method, for example, to the data transfer apparatus 100-2 by the data transfer apparatus 100-1, transferred to the data transfer apparatus 100-3 by the data transfer apparatus 100-2, and then transferred to any among the downstream data transfer apparatus 61, downstream data transfer apparatus 62, or downstream data transfer apparatus 63 by the data transfer apparatus 100-3.

As explained above, the data transfer apparatus of the first embodiment of the present invention selects communication lines that comply with dissimilar communication protocols depending on the content data, which in included in data complying with dissimilar protocols, from an upstream data transfer apparatus, and transfers the data to the downstream transfer apparatus connected to the selected communication line. Thereby, it is possible to decrease the cost for installing respective communication equipment for each dissimilar communication protocol in one exchange office.

In addition, because packets are transferred based on the line selection information, it is possible to select the transfer path by which the packets will be transferred depending on network design carried out by the network administrator or the like.

In addition, because packets are transferred depending on the virtual private network information what represents the virtual private network, it is possible to select the transfer path through which the packets will be transferred depending on the services or the like that provide the virtual private network to the user.

In addition, because packets are transferred depending on the logical line information that represents the logical line, it is possible to select the transfer path through which the packets will be transferred depending on the services or the like that provide the logical line to the user. For example, because packets are transferred depending on the label that represents LSP, it is possible to select the transfer path through which the packets will be transferred depending on the services or the like that provide LSP to the user.

Furthermore, because packets are transferred depending on VP and VC, it is possible to select the transfer path through which the packets will be transferred depending on services or the like that provide VP or VC to the user.

In addition, because packets are transferred depending on VLAN identifiers stipulated in IEEE 802.1Q, it is possible to select the transfer path through which the packets will be transferred depending on services or the like that provide VLAN to the user.

In addition, because packets are transferred according to VPN labels that represent VPN stipulated by RFC 2547, it is possible to select the transfer path through which the packets will be transferred depending on services and the like that provide MPLS-VPN to the user.

In addition, because packets are transferred depending on VC labels that represent the virtual circuit added to the protocol data unit, it is possible, for example, to select the transfer path through which the packets will be transferred depending on services and the like that provide VPN realized in layer 2 to the user.

In addition, because line selection information is input from an administrative terminal, it is possible to update the line selection information depending on input from the administrative terminal.

In addition, because the data transfer system of the first embodiment of the present invention allows network construction without using only conventional high cost data transfer apparatuses, it is possible the decrease the cost of constructing the network.

Second Embodiment

Figure 4:
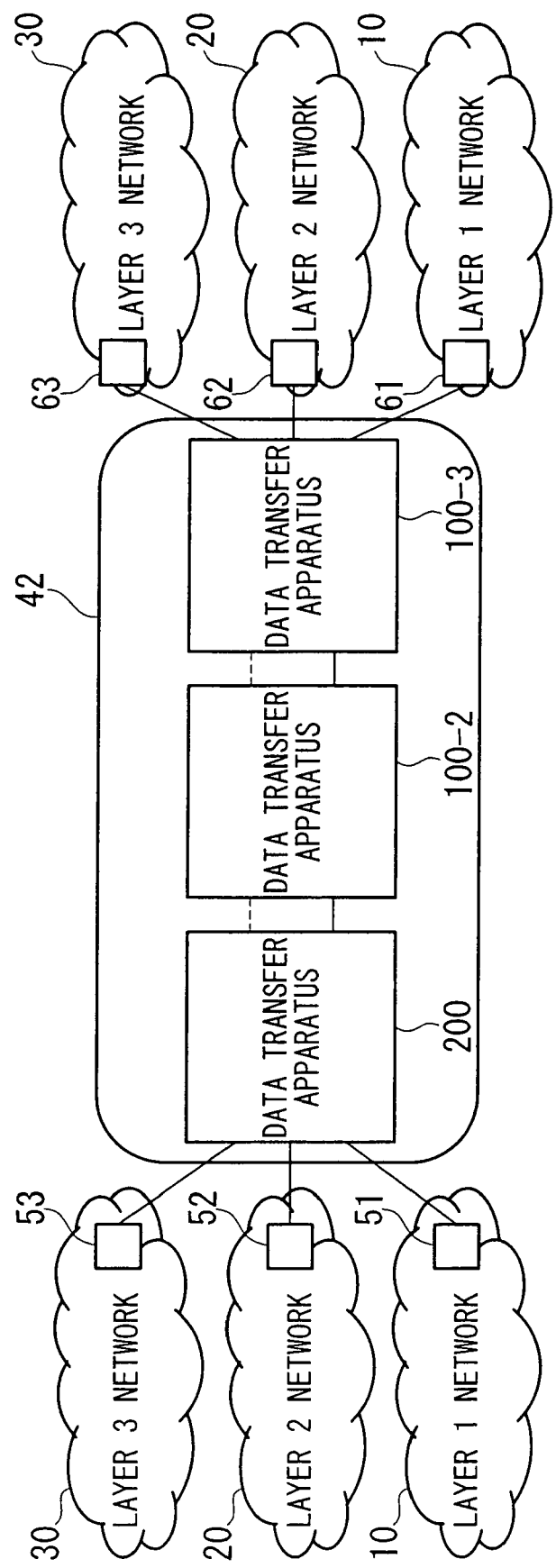
FIG. 4 is a block diagram showing the system construction of the data transfer system of the second embodiment of the present invention.

FIG. 4 is a block diagram showing the system configuration for the data transfer system according to the second embodiment of the present invention.

As shown in FIG. 4, the data transfer system 42 of the present embodiment is formed so as to include a plurality of data transfer apparatuses 100 and a data transfer apparatus 200. However, the data transfer system 42 can be formed by one data transfer apparatus 200 or can be formed by a data transfer apparatus 200 and other data transfer apparatuses. In addition, the data transfer system 42 can form a backbone network, and the backbone network is connected to an external network including a layer 1 network 10, a layer 2 network 20, and a layer 3 network 30.

Figure 5:
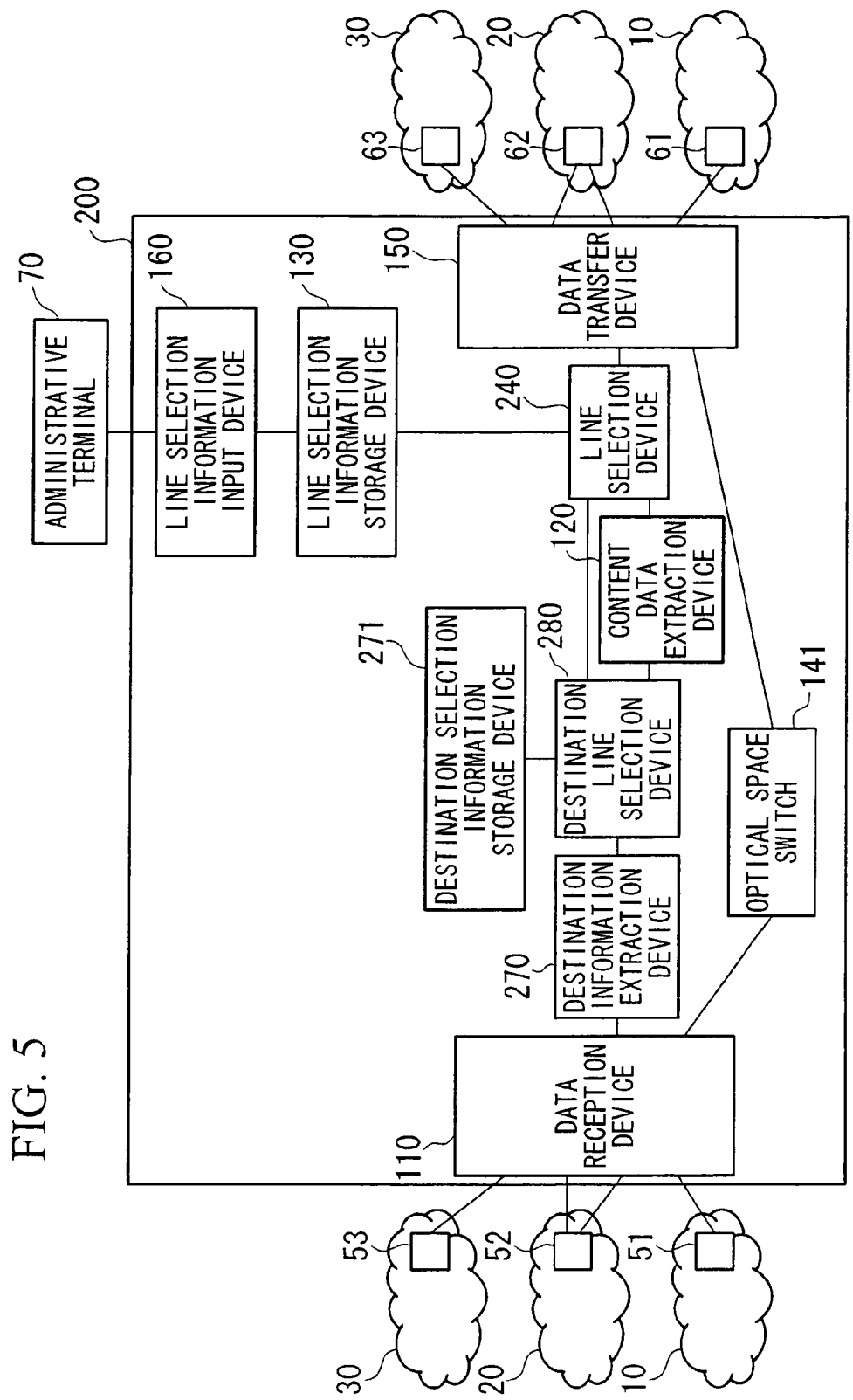
FIG. 5 is a block diagram showing the schematic structure of the data transfer apparatus of the second embodiment of the present invention.

FIG. 5 is a block diagram showing the schematic structure of the data transfer apparatus according to the second embodiment of the present invention.

As shown in FIG. 5, the data transfer apparatus 200 of the present embodiment including a data reception device 110, a content data extraction device 120, a line selection information storage device 130, a line selection device 240, an optical space switch 141, a data transfer device 150, a line selection information input device 160, a destination information extraction device 270, a destination selection information storage device 271, and a destination line selection device 280.

Note that among the devices that structure the data transfer apparatus 200 according to the second embodiment of the present invention, devices identical to the devices that form the data transfer apparatus 100 of the first embodiment are denoted by identical reference numerals, and the explanations thereof have been omitted.

The destination information extraction device 270 inputs packets output from the data reception device 110, the destination information extraction device 270 extracts the destination information that represents the destination included in the input packet, and the extracted destination information and packets are output to the destination line selection device 280.

The destination selection information storage device 271 stores the destination selection information for selecting the communication line based on the destination information. Note that the destination selection information can be generated in compliance with path control protocols such as OSPF (Open Shortest Path First) and can be input from the administrative terminal.

An example of the destination selection information that shows the association between the destination information and the identifier of the line interface is shown in Table 3.

Table 3 shows the identifier of the line interface that corresponds to the destination IP address (Internet Protocol Address) that represents the destination. Note that the line interface forms the communication line.

TABLE 3

| Destination IP address | Line interface |
| --- | --- |
| Destination IP address: from 111.0.0.0 to 111.0.0.9 | Line interface #151 |
|  | Line interface #152 |
| Destination IP address: from 222.0.0.0 to 222.0.0.9 | Line interface #152 |
| Destination IP address: from 333.0.0.0 to 333.0.0.9 | Line interface #153 |
| Other destination IP addresses | Line interface #154 |

For example, the destination information included in the packet is a destination IP address, and in the case that the destination IP address represents "Destination IP address: from 111.0.0.0 to 111.0.0.9", the line interface 151 and the line interface 152 are selected.

The destination information and the packets output from the destination information extraction device 270 are input into the destination line selection device 280, and the destination line selection device 280 selects the line interface corresponding to the input destination information based on the destination selection information stored in the destination selection information storage device 271.

In the case that a plurality of line interfaces are selected, the destination line selection device 280 outputs the input packets to the content data extraction device 120.

In the case that a plurality of line interfaces are not selected, the destination line selection device 280 outputs the selected line identifier that represents the selected line interface and the input packet to the line selection device 240.

The selected line identifier and the packet output from the destination line selection device 280 are input into the line selection device 240, and the line selection device 240 outputs the input selected line identifier and the input packet to the data transfer device 150.

In addition, the content data and the packets output from the content data extraction device 120 are input into the line selection device 240, and the line selection device 240 selects the line interface corresponding to the input content data based on the line selection information stored in the line selection information storage device 130, and the selected line identifier that represents the selected line interface and the input packet are output to the data transfer device 150.

Below, the operation of the data transfer apparatus according to the second embodiment of the present invention will be explained with reference to FIG. 6.

Figure 6:
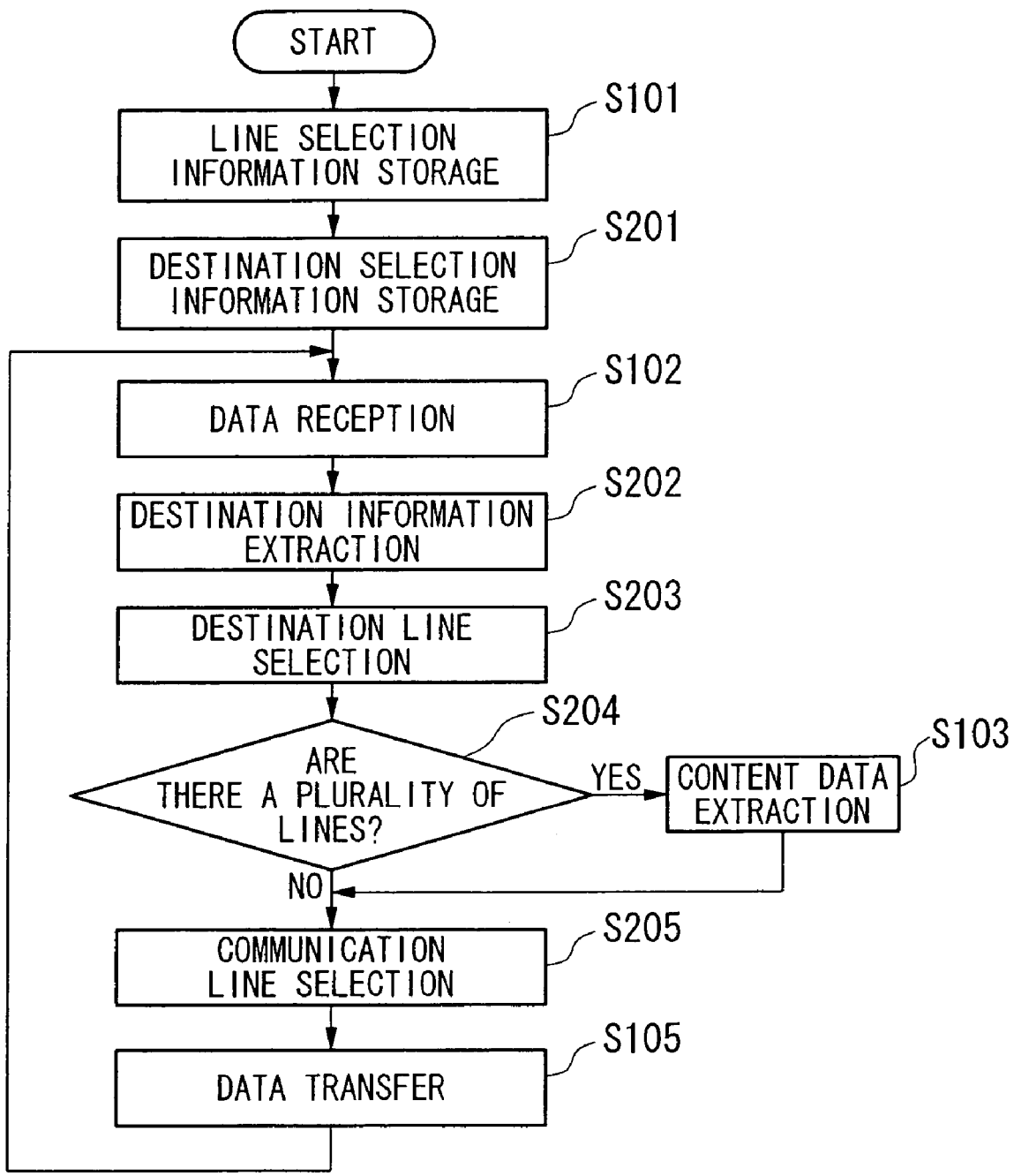
FIG. 6 is a flowchart showing the operation of the data transfer apparatus of the second embodiment of the present invention.

FIG. 6 is a flowchart showing the operation of the data transfer apparatus according to the second embodiment of the present invention. Note that the operations of the data transfer apparatus 200 of the second embodiment of the present invention that are identical to the operation of the data transfer apparatus of the first embodiment described above are denoted by the same reference symbols, and their explanation has been omitted.

First, the destination selection information is generated in compliance with a path control protocol such as OSPF, and stored in the destination selection information storage device 271 (step S 201).

When the packets are input into the destination information extraction device 270, the destination information included in the packets is extracted by the destination information extraction device 270 (step S 202).

Next, when the packets and destination information are input into the destination line selection device 280, based on the destination selection information stored in the destination selection information storage device 271, the line interface associated with the destination information is selected by the destination line selection device 280 (step S 203).

In the case that a plurality of line interfaces have been selected, the packets are input into the content data extraction device 120 from the destination line selection device 280. In the case that a plurality of line interfaces has not been selected, the packets are output from the destination line selection device 280 to the line selection device 240 (step S 204).

Next, when the packets are input into the line selection device 240, based on selected line identifiers and packets output from the destination line selection device 280 or based on the line selection information stored in the line selection information storage device 130, the line selection identifier that represents the line interface associated with the content data is selected, and the selected line identifier that represents the selected line interface and the packets are output to the data transfer device 150 (step S 205).

Note that in the data transfer system 42 shown in FIG. 4, the data transmitted from the upstream data transfer apparatus 51, the upstream data transfer device 52, or the upstream data transfer apparatus 53 to the data transfer apparatus 200 is transferred by using a relay method, for example, to the data transfer apparatus 100-2 by the data transfer apparatus 200, transferred to the data transfer apparatus 100-3 by the data transfer apparatus 100-2, and transferred to any among the downstream data transfer apparatus 61, the downstream data transfer apparatus 62, or the downstream data transfer apparatus 63 by the data transfer apparatus 100-3.

As explained above, the data transfer apparatus according to the second embodiment of the present invention can select transfer paths for packets depending on network design carried out by the network administrators because the packets are transferred based on line selection information, even in a network structure in which there are a plurality of transfer paths based on destination information included in the packets.

In addition, because the data transfer system according to the second embodiment of the present invention allows network construction without using only conventional high cost data transfer apparatuses, it is possible the decrease the cost of constructing the network.

Third Embodiment

Figure 7:
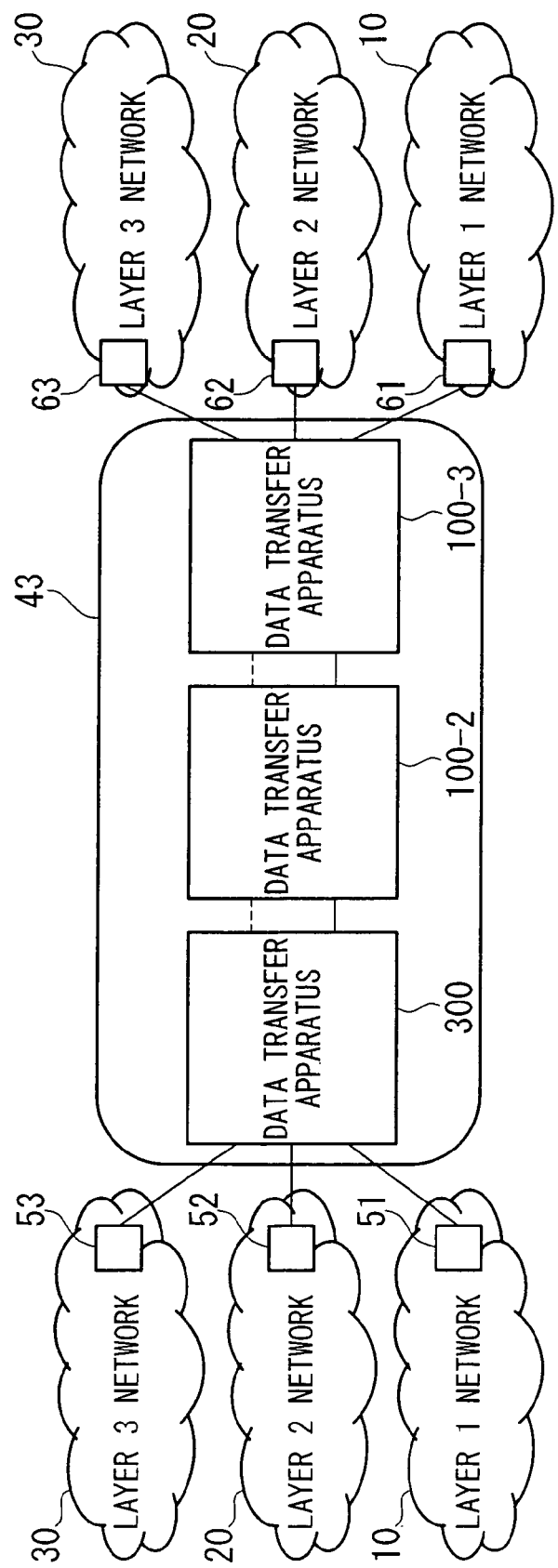
FIG. 7 is a block diagram showing the system structure of the data transfer system of the third embodiment of the present invention.

FIG. 7 is a block diagram showing the system structure of the data transfer system according to the third embodiment of the present invention.

As shown in FIG. 7, the data transfer system 43 of the present embodiment is formed so as to include a plurality of data transfer apparatuses 100 and a data transfer apparatus 300. However, the data transfer system 43 can be formed by one data transfer apparatus 300, or can be formed by a data transfer apparatus 300 and other data transfer apparatuses. In addition, the data transfer system 43 can form a backbone network, and the backbone network can be connected to an external network including a layer 1 network 10, a layer 2 network 20, and a layer 3 network 30.

Figure 8:
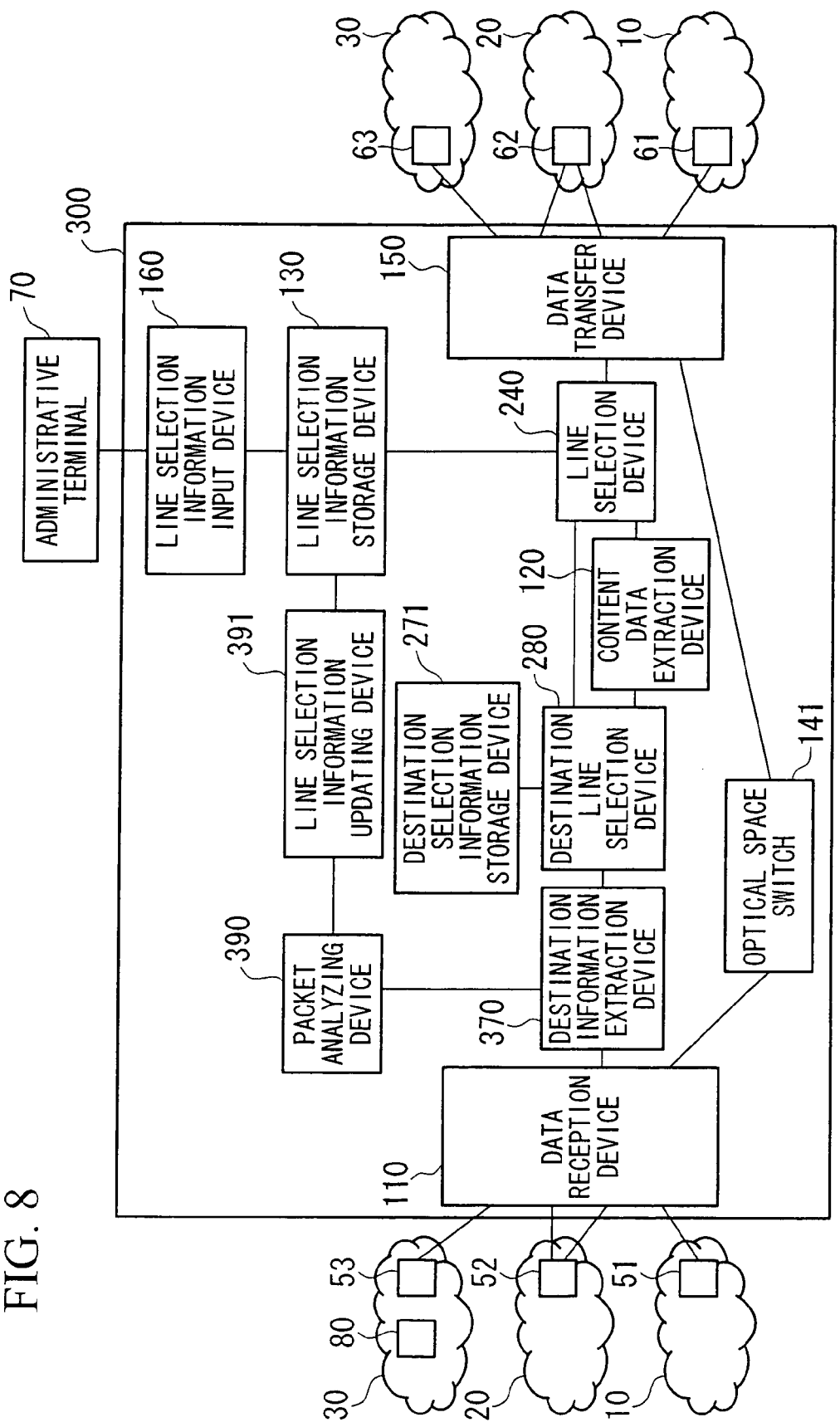
FIG. 8 is a block diagram showing the schematic structure of the data transfer apparatus of the third embodiment of the present invention.

FIG. 8 is a block diagram showing a schematic structure of the data transfer apparatus according to the third embodiment of the present invention.

As shown in FIG. 8, the data transfer apparatus 300 of the present embodiment including a data reception device 110, a content data extraction device 120, a line selection information storage device 130, a line selection device 240, an optical space switch 141, a data transfer device 150, a line selection information input device 160, a destination information extraction device 370, a destination selection information storage device 271, a destination line selection device 280, a packet analyzing device 390, and a line selection information updating device 391.

Note that among the devices that form the data transfer apparatus 300 of the third embodiment of the present invention, devices identical to those that form the data transfer apparatus 200 of the second embodiment described above are denoted by identical reference numerals and their explanation is omitted.

The packets output from the data reception device 110 are input into the destination information extraction device 370, the destination information extraction device 370 extracts the destination information that represents the destination contained in the input packets, and the extracted destination information and the packets are output to the destination line selection device 280.

In addition, when the extracted destination information represents its own address, the destination information extraction device 370 outputs packets to the packet analyzing device 390.

For example, when the data transfer apparatus 300's own address is "100" and the destination information is "100", the destination information extraction device 370 outputs the packets to the packet analyzing device 390.

The packets output from the destination information extraction device 370 are input into packet analyzing device 390, the packet analyzing device 390 analyzes the input packets, and the analyzed information is output to the line selection information updating device 391.

The analyzed information output from the packet analyzing device 390 is input into the line selection information updating device 391, and the line selection information updating device 391 updates the line selection information stored in the line selection information storage device 130 based on the input analyzed information.

An example of the line selection information updated based on the line selection information shown in Table 2 is shown in Table 4.

At this time, the content data contained in the packet is a label that forms a shim header, and in the case that the shim header indicates "label: from 6 to 9", the packets are transferred via the line interface 151.

For example, in the case that a packet transmitted by a predetermined terminal is transferred via the layer 1 network 10 included in the downstream data transfer apparatus 61, an updating packet for updating the line selection information is transmitted from the server 80, and the line selection information shown in FIG. 2 is updated as shown in FIG. 4 based on the updating packet.

TABLE 4

| Content data (logical line information) | Line interface |
|---|---|
| Label forming the shim header: from 1 to 5 | Line interface #151 |
| VP: from 10 to 20 | Line interface #152 |
| VP = 1 and VC: from 101 to 200 | Line interface #153 |
| Other packets | Line interface #154 |
| Label forming the shim header: from 6 to 9 | Line interface #151 (updated) |

Below, the operation of the data transfer apparatus according to the third embodiment of the present invention will be explained with reference to the figures.

Figure 9:
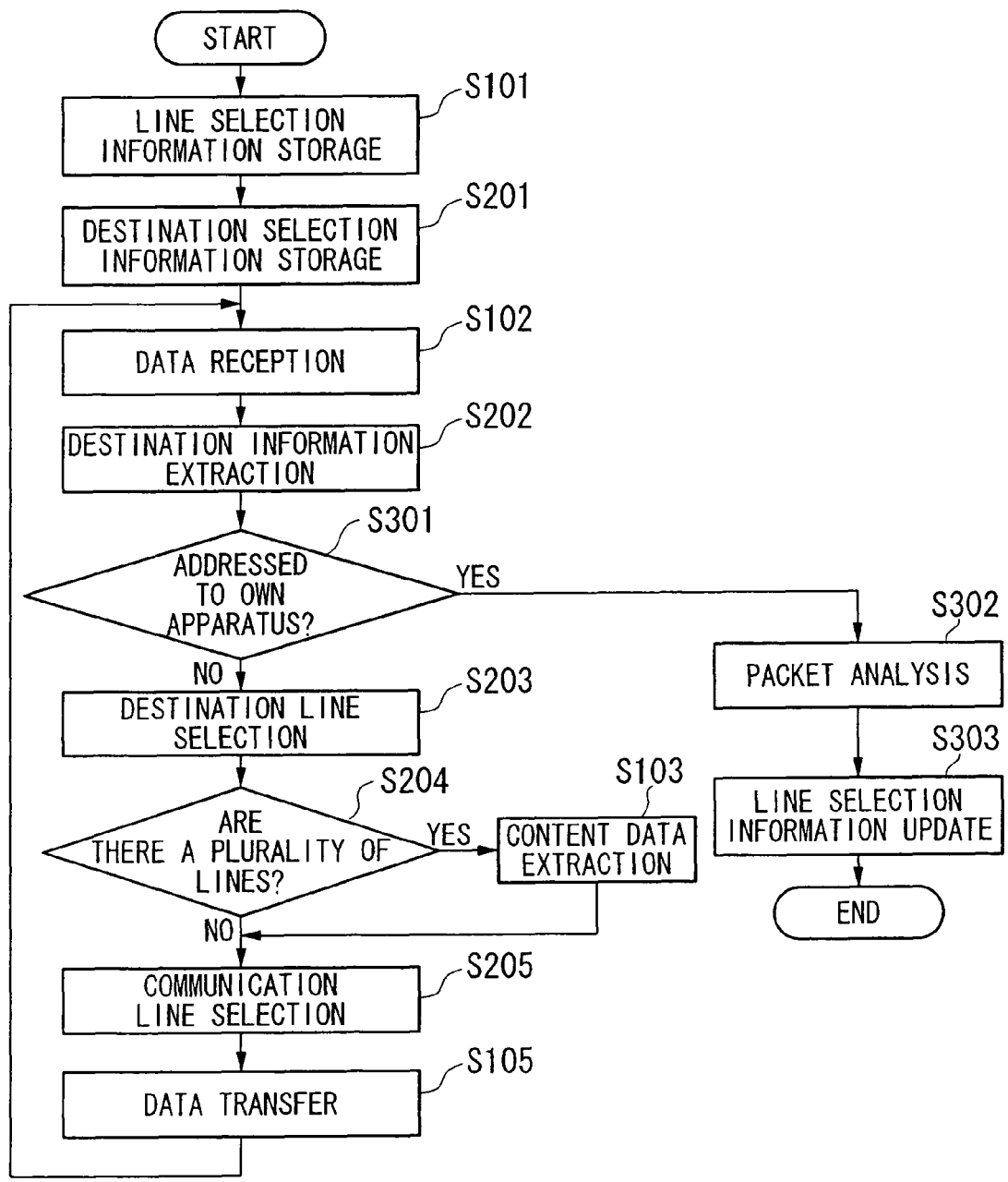
FIG. 9 is a flowchart showing the operation of the data transfer apparatus of the third embodiment of the present invention.

FIG. 9 is a flowchart showing the operation of the data transfer apparatus according to the third embodiment of the present invention. Note that among the operations of the data transfer apparatus 300 according to the third embodiment of the present invention, operations identical to those of the data transfer apparatus according to the second embodiment described above are denoted by the same reference symbols, and their explanation is omitted.

First, in the case that the destination information extracted by the destination information extraction device 370 indicates its own destination address, the packet is output to the packet analyzing device 390 by the destination information extraction device 370. In the case that the destination information extracted by the destination information extraction device 370 does not indicate its own address, the packet is output to the destination line selection device 280 by the destination information extraction device 370 (step S 301).

Next, when the packet is input into the packet analyzing device 390, the packet is analyzed by the packet analyzing device 390 (step S 302).

When the analyzed information is input into the line selection information updating device 391, the line selection information is updated by the line selection information updating device 391 (step S 303).

Note that in the data transfer system 43 shown in FIG. 7, the data transmitted to the data transfer apparatus 300 from the upstream data transfer apparatus 51, the upstream data transfer device 52, and the upstream data transfer apparatus 53 is transferred by using a relay method, for example, to the data transfer apparatus 100-2 by the data transfer apparatus 300, transferred to the data transfer apparatus 100-3 by the data transfer apparatus 100-2, and then transferred to any among the downstream data transfer apparatus 61, downstream data transfer apparatus 62, or downstream data transfer apparatus 63 by the data transfer apparatus 100-3.

As explained above, the data transfer apparatus according to the third embodiment of the present invention can select the transfer path for packets automatically depending on the request from the server or the terminal of the user because the line selection information is updated depending on a predetermined packet that has been transmitted from a server or the terminal of a user.

In addition, the data transfer system according to the third embodiment of the present invention can decrease the cost for constructing the network because the network construction is possible without using only conventional high cost data transfer apparatuses.

Fourth Embodiment

Similar to the first embodiment through the third embodiment described above, the fourth embodiment relates to decreasing the network cost, and decreases the network cost by raising the transfer efficiency of the packets by reducing the processing load. Below, only the characteristics of the fourth embodiment will be explained, but it is possible to realize a further reduction in the network cost by applying the first embodiment through the third embodiment to the present embodiment.

Figure 11:
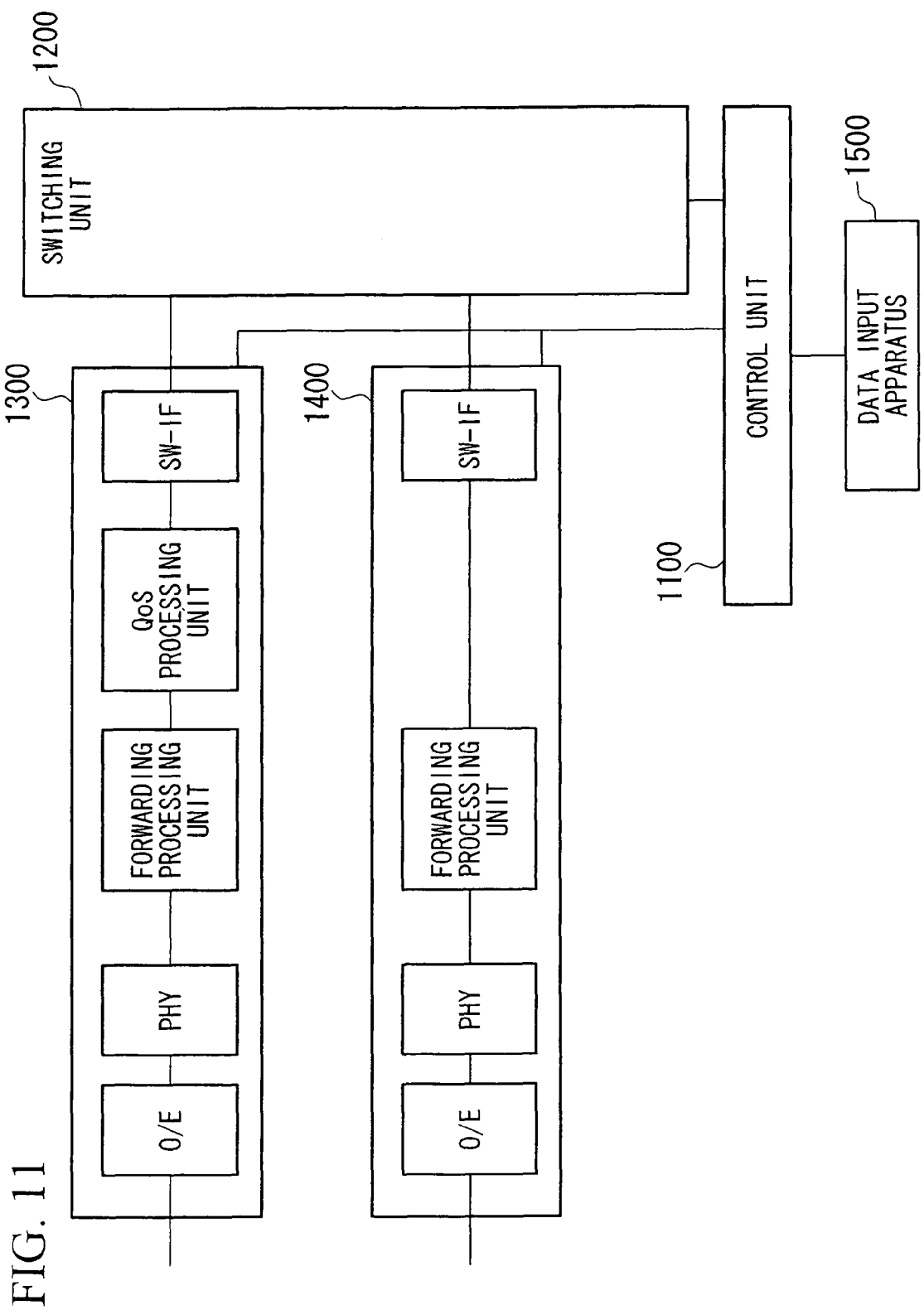
FIG. 11 is a block diagram showing the schematic structure of the router apparatus of the fourth embodiment of the present invention.

FIG. 11 is a block diagram showing the schematic structure a router apparatus according to the fourth embodiment of the present invention.

In FIG. 11, the router apparatus according to the present embodiment is connected to lines and controls the transfer of packets received from the lines. In addition, the router apparatus includes a first and second line interface units (1300 and 1400) that control the transmission of packets to the relevant lines; switching unit 1200 that switches the packets input from the first and second line selection units (1300 and 1400) and outputs the packets to a predetermined line interface unit on the egress; a control unit 1100 that controls the first and second line interface units (1300 and 1400) and the switching unit 1200; and a data input apparatus 1500 for inputting each type of data to the router apparatus.

The connection between the first and second line interface units (1300 and 1400) and the switching unit 1200 is formed so as to be attachable and detachable, and it is possible to connect the switching unit 1200 by freely combining the line interface units that have dissimilar functions to form the router apparatus.

Figure 12:
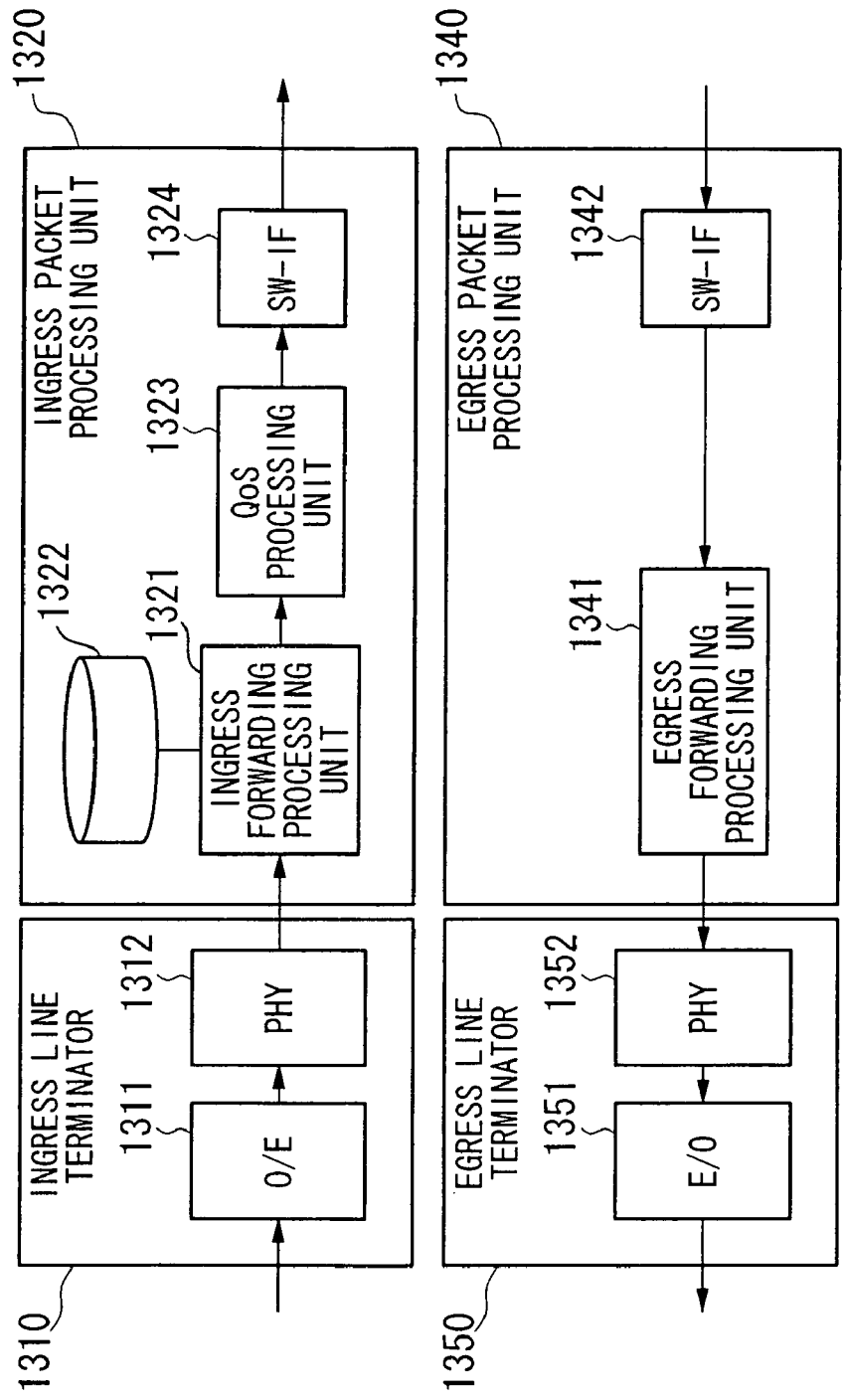
FIG. 12 is a block diagram showing the schematic structure of the first line interface unit shown in FIG. 11.

FIG. 12 is a block diagram showing a schematic structure of the first line interface unit 1300 shown in FIG. 11. The first line interface unit 1300 can be used in connections outside the network, such as another network.

As shown in FIG. 12, the first line interface unit 1300 includes an ingress line terminator 1310, an ingress packet processing unit 1320, an egress packet processing unit 1340, and an egress line terminator 1350.

The ingress line terminator 1310 is connected to another network via a line, extracts the packets from data received via that line, and the ingress packet processing unit 1320 carries out processing such that the packets extracted by the ingress line terminator 1310 are switched to a desired egress line.

The egress packet processing unit 1340 processes packets switched by the switching unit 1200 into output packets, and the egress line terminator 1350 transmits the packets input from the egress packet processing unit 1340 to another network or another router apparatus via a connected line.

The ingress line terminator 1310 provides an optical/electrical (O/E) converting unit 1311 that converts an optical signal into an electrical signal and an ingress physical layer processing unit 1312 that extracts packets by carrying out processing for the physical layer on the electric signal that has been converted by the O/E conversion unit 1311.

The ingress packet processing unit 1320 provides an ingress forwarding processing unit (ingress FW processing unit) 1321, a data memory unit 1322, a QoS processing unit 1323, and an input switching interface unit (SW-IF) 1324.

Based on the destination address of the input packets, the ingress forwarding processing unit 1321 finds the switching tags in each of the router apparatuses that are passed through up to the network indicated by this destination address (including the apparatus itself; that is, each of the routing apparatuses positioned along the transfer path of the packets within the network), affixes the apparatus's own switching tag to the packets, and at the same time, sets the switching tags of other apparatuses to the label of the respective shim headers, and affixes the switching tags to the shim headers in the order of the transfer path order.

The data memory unit 1322 is connected to the ingress forwarding processing unit 1321, and for each of the addresses of the other networks, stores the switching tags and the like of the router apparatuses through which the packets pass up to these other networks.

The QoS processing unit 1323 carries out QoS (Quality of Service) processing, such as DiffServ (differentiated services), coloring, and policing, on the packets.

The ingress switching interface unit 1324 outputs the packets to the switching unit 1200.

Egress packet processing unit 1340 provides an egress switching interface unit 1342 that outputs the packets output by the switching unit 1200 to the egress forwarding processing unit 1341 and an egress forwarding processing unit 1341 that outputs the packets to the egress line terminator 1350 after eliminating the switching tags affixed to the packets.

The egress line terminator 1350 provides an egress physical layer processing unit 1352 that converts packets input from the egress packet processing unit 1340 into a signal for the physical layer and an electric/optical (E/O) conversion unit 1351 that converts the signal that has been converted by the egress physical layer processing unit 1352 into an optical signal.

Figure 13:
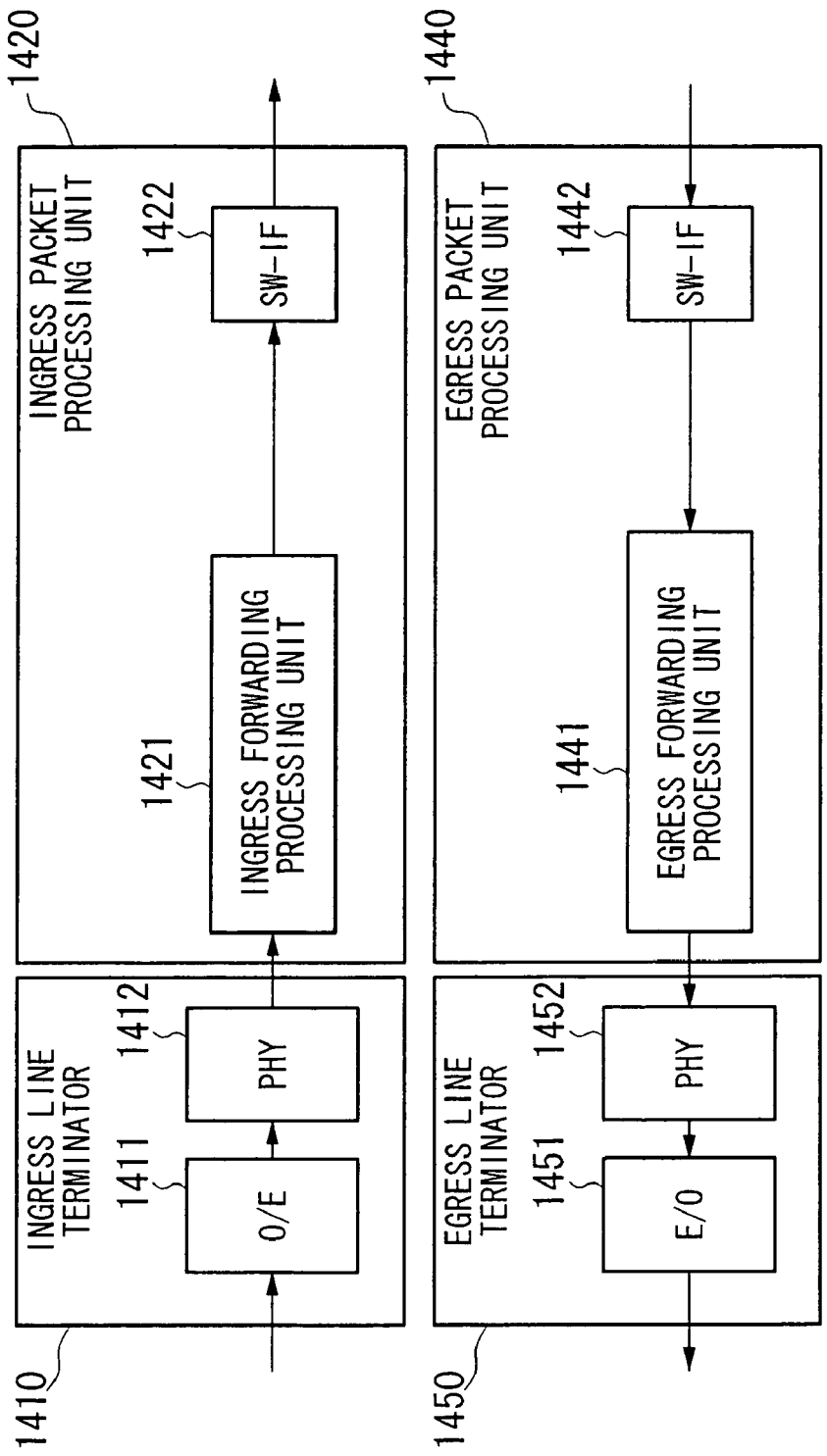
FIG. 13 is a block diagram showing the schematic structure of the second line interface unit shown in FIG. 11.

FIG. 13 is a block diagram showing the schematic structure of the second line interface unit 1400 shown in FIG. 11. The second line interface unit 1400 is used at the connections between router apparatuses.

As shown in FIG. 13, the second line interface unit 1400 provides an ingress line terminator 1410, an ingress packet processing unit 1420, an egress packet processing unit 1440, and an egress line terminator 1450.

The ingress line terminator 1410 is connected via lines to other router apparatuses and extracts packets from the data received via these lines.

The ingress packet processing unit 1420 carries out processing in which the packets extracted by the ingress line terminator 1410 are switched to the desired egress line.

The egress packet processing unit 1440 processes the packets switched by the switching unit 1200 into output packets.

The egress line terminator 1450 transmits the packets input from the egress packet processing unit 1440 to other routing apparatuses via the connected lines.

The ingress terminator 1410 provides an optical/electrical (O/E) converting unit 1411 that converts an optical signal into an electrical signal and an ingress physical layer processing unit 1412 that extracts packets by carrying out processing for the physical layer on the electric signal that has been converted by the O/E converting unit 1411.

The ingress packet processing unit 1420 provides an ingress forwarding processing unit 1421 and an ingress switching interface unit 1422 that outputs packets to the switching unit 1200.

The ingress forwarding processing unit 1421 affixes the value of the label of the top shim header of the input packet to the packet as the apparatus's own switching tag, and at the same time, deletes the top shim header, and moves the next shim header to the top.

The egress packet processing unit 1440 provides an egress switching interface unit 1442 that outputs the packet output by the switching unit 1220 to the egress forwarding processing unit 1441 and an egress forwarding processing unit 1441 that outputs the packets to the egress line terminator 1450 after deleting the switching tag affixed to the packets.

The egress line terminator 1450 provides an egress physical layer unit 1452 that converts packets input from the egress packet processing unit 1440 into a signal for the physical layer, and an electrical/optical (E/O) converting unit 1451 that converts a signal that has been converted by the egress physical processing unit 1452 into an optical signal.

In addition, the data input apparatus 1500 can be connected to the control unit 1100 of the router apparatus, and as shown in FIG. 14, the data input apparatus 1500 can store a routing table in which the switching tags in router apparatuses (including one for the apparatus itself) are arranged for each of the addresses of other networks in order from the apparatus itself up to the other networks, the router apparatuses being positioned along the transfer path of the packets in the networks, in the memory apparatus of the control unit 1100, and at the initial setting and at the time that the content of the routing table has been rewritten, the control unit 1100 transfers and stores the routing table in the data memory unit 1322 of the ingress packet processing unit 1320 of the first line interface unit 1300.

In a network formed by such routing apparatuses, in order to function the router. apparatus as an edge router, the connection lines with other networks are accommodated in the first line interface unit 1300, and the connection line with core router apparatuses in the network are accommodated in the second line interface unit 1400.

In addition, to function the router apparatus as a core router apparatus, the connecting lines with other core router apparatuses or edge router apparatuses are accommodated in the second line interface unit 1400.

When data from another network is received at the ingress line terminator 1310 of the first line interface unit 1300 of the edge router apparatus of the network formed by edge router apparatuses and core router apparatuses, the ingress physical layer processing unit 1312 extracts the packets from the incoming data, and inputs the packets into the ingress packet processing unit 1320.

Figure 15:
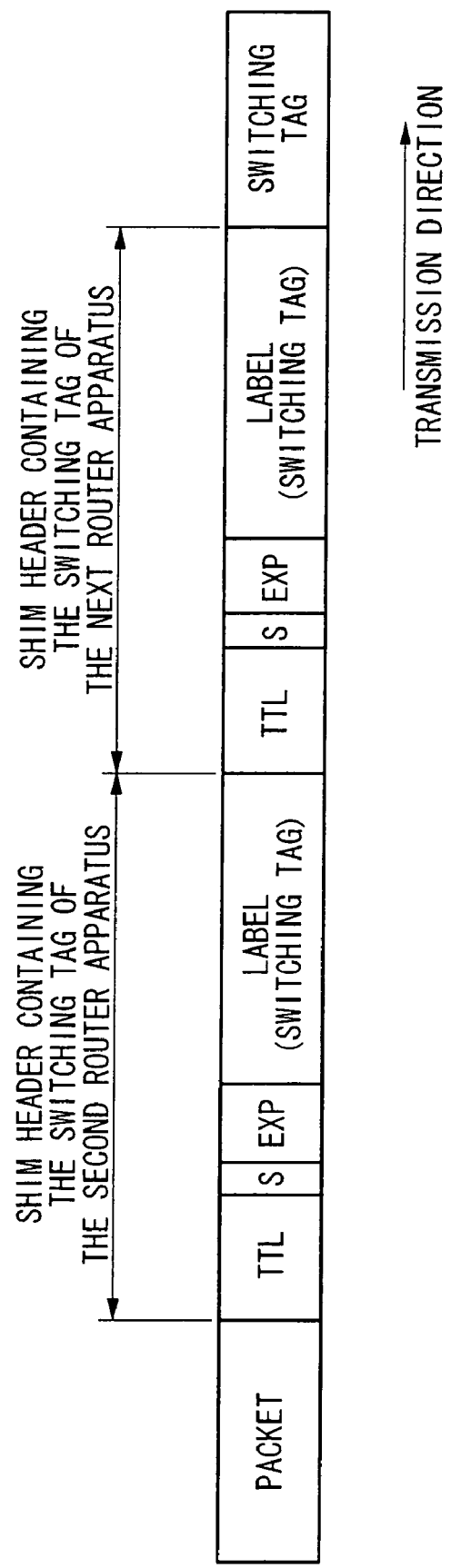
FIG. 15 is a drawing showing the format of a packet that is input into the switching unit shown in FIG. 11.

The ingress forwarding processing unit 1321 of the ingress packet processing unit 1320 refers to the destination address of the input packets, reads the switching label of the line in which the upper bit of the destination address of the incoming packets agrees with the value of the column of the address prefix by using a routing table (such as that shown in FIG. 14) stored in the data memory unit 1322, affixes the top switching tag (in FIG. 14, tag 1 or tag 4) to the packet as the switching tag of the apparatus itself, sets the switching tags that follow this to the label of the format of the shim header of the MPLS protocol, the set shim headers are arranged in their transfer path order up to the destination network, these shim headers are affixed to the packets as stacked shim headers, and the packets are then passed to the QoS processing unit 1323 using a format such as the one shown in FIG. 15.

The QoS processing unit 1323 carries out DiffServ (differentiated services) processing and well-known QoS processing such as coloring and policing on the packets, and outputs the packets to the switching unit 1200 via the ingress switching interface unit 1324.

The packets input into the switching unit 1200 are switched by the switching unit 1200 according to the affixed switching tags, and the packets are output to the second line interface unit 1400 (transfer to a core router apparatus or an edge router apparatus) or the first line interface unit 1300 (returned to the apparatus itself) indicated by the switching tag.

In the case of transfer to a core router apparatus or an edge router apparatus, the packets that have been input into the second line interface unit 1400 are input into the egress forwarding processing unit 1441 via the egress switching interface unit 1442, the apparatus's own switching tag is deleted by the egress forwarding processing unit 1441, the packets are converted into signals for the physical layer by the egress line terminator 1450, and the packets are then converted to an optical signal and delivered to a line.

Similar to the case of the returning to the apparatus itself, the apparatus's own switching tags are deleted from the packets by the egress forwarding processing unit 1341 of the first line interface unit 1300, the packets are converted into signals for the physical layer by the egress line terminator 1350, and then the packets are converted to an optical signal and transmitted to a line.

Next, in the core router apparatus, when the data is received from the edge router apparatus or the core router apparatus in the network by the ingress line terminator 1410 of the second line interface unit 1400, the ingress physical layer processing unit 1412 extracts the packets from the received data, and inputs the packets into the ingress packet processing unit 1420.

The ingress forwarding processing unit 1421 of the ingress packet processing unit 1420 refers to the top shim header among the stacked shim headers of the input packets, affixes the value in the label of this shim header to the packet as the apparatus's own switching tag, carries out editing in which the top shim header is deleted and the next shim header is moved to the top, and outputs the packets to the switching unit 1200 via the ingress switching interface unit 1422.

The packets input into the switching unit 1200 are switched by the switching unit 1200 depending on the affixed switching tags, and the packets are output to the second line interface unit 1400 (transferred to a core router apparatus or an edge router apparatus) indicated by the switching tag.

The packets that have been input into the second line interface unit 1400 are input into the egress forwarding processing unit 1441 via the egress switching interface unit 1442, the apparatus's own switching tag is deleted by the egress forwarding processing unit 1441, the packets are converted into signals for the physical layer by the egress line terminator 1450 and then converted into optical signals, and transmitted to a line.

Next, in the edge router apparatus, when the data from a core router apparatus or an edge router apparatus in the network is received by the ingress line terminator 1410 of the second line interface unit 1400, the ingress physical layer processing unit 1412 extracts the packets from the incoming data and outputs the packets to the ingress packet processing unit 1420.

The ingress forwarding processing unit 1421 of the ingress packet processing unit 1420 refers to the shim header at the top of the stacked shim headers of an input packet, affixes a value in the label of this shim header to the packet as the apparatus's own switching tag, and at the same time, deletes the shim header at the top and outputs the packets to the switching unit 1200 via the ingress switching interface unit 1422.

The packets input into the switching unit 1200 are switched by the switching unit 1200 depending on the affixed switching tags, and output to the first line interface unit 1300 (transmitted to another network) indicated by the switching tags.

The packets input into the first line interface unit 1300 are input into the egress forwarding processing unit 1341 via the egress switching interface unit 1342, the apparatus's own switching tag is deleted by the egress forwarding processing unit 1341, the packets are converted into physical layer signals by the egress line terminator 1350, and the signals are converted into optical signals and transmitted to the line.

In this manner, according to the present embodiment, in the edge router apparatus, switching tags for the router apparatuses (including the apparatus itself) that are passed through up to other networks represented by the destination addresses of the packets (the router apparatuses positioned along the transfer path of the packets in the network) are attached to the packets arranged in the transfer path order and transmitted. In the core router apparatus, the switching of the apparatus itself is carried out by the tag at the top of the switching tags affixed to the packets, and the packet is transmitted after the next tag is moved to the top. Thereby, it is possible to eliminate the search processing for the output label and the search processing for the switching tags based on the input labels of the core router apparatus, and thus it is possible to decrease the processing load.

Moreover, in the present embodiment, the routing table is input by the data input apparatus 1500, but the routing table can be created by reporting information between the router apparatuses, as in the well-known OSPF (Open Shortest Path First) protocol.

In this case, an edge router apparatus reports to the core router apparatus or edge router apparatus connected thereto the network address of other networks connected to the apparatus itself and the switching information to the other networks as path information, and each of the router apparatuses affixes switching information (switching tag) for switching to an adjacent router apparatus at the apparatus itself to the path information reported from the adjacent router apparatus and notifies other adjacent router apparatuses.

In addition, the edge router apparatus that has received this path information creates a routing table by using the received path information.

Thereby, in this method, the packets follow the path from one edge router apparatus to another edge router apparatus in reverse order while the switching information is sequentially added to the packets, and thereby the switching information is reported to another edge router and a routing table is created.

While the invention made by the present inventors has been described concretely based on the aforementioned embodiments, it should be understood that the present invention is not limited to these embodiments. Modifications can be made without departing from the spirit of the present invention.

For example, it is possible to implement a further decrease in the network cost by combining the first through third embodiments with the fourth embodiment that are described above.

INDUSTRIAL APPLICABILITY

According to the present invention, communication lines that conform to dissimilar communication protocols are selected according to the content data included in data conforming to dissimilar communication protocols from upstream data transfer apparatuses, and the data is transferred to downstream data transfer apparatuses connected to the selected communication line. Thereby, the cost of installing in one exchange office communication equipment compatible with each of these dissimilar communication protocols and the cost of constructing the networks can be reduced.

In addition, according to the present invention, in the edge router apparatuses, information for switching the packets in each of the router apparatuses positioned on the transfer path of the packets within the network up to networks represented by destination addresses of the packets is affixed to the to the packets in the transfer path order, at the core router apparatuses, switching is carried out by using the switching information affixed to the packet, and transfer is carried out after deleting in sequence the used switching information. Thereby, in the core routing apparatuses, it is not necessary to carry out a search of the switching information, it is possible to reduce the processing load, and it becomes possible to increase the packet transfer efficiency. As a result, it is possible to reduce the cost of the network that includes the router apparatuses.

Furthermore, according to the present invention, for each of the other network addresses, there is a routing table that stores the switching information for switching the packets at each of the router apparatuses positioned on the transfer path of the packets in the network up to the other networks, and the switching information is found in this routing table. Thus, it is possible to find the switching information simply, and it becomes possible to reduce the processing load. Thereby, it is possible to reduce the cost of the network that includes router apparatuses.

In addition, because the content of the routing table is set from the data input apparatus, it becomes possible to carry out the setting of the routing table simply.

In addition, because the routing table is created after information has been reported between router apparatuses, it becomes possible to carry out the setting of the routing table automatically.

The invention claimed is:

1. A data transfer apparatus that receives data from an adjacent upstream data transfer apparatus and transfers the received data to an adjacent downstream data transfer apparatus, comprising:
   a data reception device that receives packets that comply to dissimilar communication protocols from the upstream data transfer apparatus;
   a content data extraction device that extracts content data included in a packet received by the data reception device;
   a line selection information storage device in which line selection information for selecting one of communication lines that comply with dissimilar communication protocols is stored;
   a line selection device that selects a communication line corresponding to the content data extracted by the content data extraction device based on the line selection information stored in the line selection information storage device; and
   a data transfer device that transfers the packet to the downstream data transfer apparatus that is connected to the communication line that has been selected by the line selection device,
   wherein the content data includes virtual private network information that represents a virtual private network or logical line information that represents a logical line, and
   in the case in which a packet which includes contents data having a value outside a range defined in the line selection information stored in the line selection information storage device is input, in the case in which a packet which includes contents data which does not include virtual private network information is input when the content data includes the virtual private network information, or in the case in which a packet which includes contents data which does not include logical line information is input when the content data includes the logical line information, the line selection device selects a predetermined communication line.

2. A data transfer apparatus that receives data from an adjacent upstream data transfer apparatus and transfers the received data to an adjacent downstream data transfer apparatus, comprising:
   a data reception device that receives packets that comply to dissimilar communication protocols from the upstream data transfer apparatus;
   a destination information extraction device that extracts destination information that represents a destination included in a packet that has been received by the data reception device;
   a destination selection information storage device that stores destination selection information for selecting a communication line;
   a destination line selection device that selects a communication line corresponding to the destination information that has been extracted by the destination information extraction device based on the destination selection information that is stored in the destination information storage device;
   a content data extraction device that extracts content data included in a packet received by the date reception device when a plurality of communication lines have been selected by the destination line selection device;
   a line selection information storage device that stores line selection information for selecting one of the communication lines that comply with dissimilar communication protocols;
   a line selection device that selects the communication line that has been selected by the destination line selection device when the plurality of communication lines have not been selected or selects a communication line corresponding to the content data extracted by the content data extraction device based on the line selection information stored in the line selection information storage device when the plurality of communication lines have been selected; and
   a data transfer apparatus that transfers the packet to the downstream data transfer apparatus connected to the communication line that has been selected by the line selection device,
   wherein the content data includes virtual private network information that represents a virtual private network or logical line information that represents a logical line, and
   in the case in which a packet which includes contents data having a value outside a range defined in the line selection information stored in the line selection information storage device is input, in the case in which a packet which includes contents data which does not include virtual private network information is input when the content data includes the virtual private network information, or in the case in which a packet which includes contents data which does not include logical line information is input when the content data includes the logical line information, the line selection device selects a predetermined communication line.

3. A data transfer apparatus according to claim 2, further comprising:
   a packet analyzing device that analyzes the packet received by the data reception device when the destination information extracted by the destination information extraction device represents its own address; and
   a line selection information updating device that updates the line selection information stored in the line selection information storage device based on information that has been analyzed by the packet analyzing device.

4. A data transfer apparatus according to claim 1, further comprising:
   a line selection information input device that inputs the line selection information; and wherein:
   the line selection information storage device stores the line selection information input from the line selection information input device.

5. A data transfer apparatus according to claim 2, further comprising:
a line selection information input device that inputs the line selection information; and wherein:
the line selection information storage device stores the line selection information input from the line selection information input device.

6. A data transfer apparatus according to claim 3, further comprising:
a line selection information input device that inputs the line selection information; and wherein:
the line selection information storage device stores the line selection information input from the line selection information input device.

7. A data transfer apparatus according to any one of claims 1 through 6, wherein:
the virtual private network information includes a VLAN identifier stipulated in IEEE 802.1Q.

8. A data transfer apparatus according to any one of claims 1 through 6, wherein:
the virtual private network information includes a VPN label that represents a VPN stipulated in RFC 2547.

9. A data transfer apparatus according to any one of claims 1 through 6, wherein:
the virtual private network information includes a VC label that represents a virtual circuit affixed to a protocol data unit.

10. A data transfer system, wherein:
a data transfer apparatus according to any of claims 1 through 6 transfers data to another data transfer apparatus according to any of claims 1 through 6 according to a relay method.

11. An edge router apparatus that is disposed at a connection between a network and the outside of the network, receives a packet from the outside of the network and transfers the packet to a router apparatus within the network, or transmits a packet from a router within the network to the outside of the network, comprising:
a switching information calculation device that obtains switching information for switching the received packet at each router apparatus positioned along a transfer path of the received packet within the network based on a destination address of the packet received from the outside of the network; and
a transmitting device that affixes to the received packet the switching information obtained by the switching information calculation device in a transfer path order starting from a router apparatus subsequent to the edge router apparatus itself, and transmits the received packet to which the switching information has been affixed to a transfer destination router apparatus.

12. An edge router apparatus that is disposed at a connection between a network and another network, receives a packet from the other network and transfers the packet to a router apparatus within the network, or transmits a packet from a router apparatus within the network to the other network, comprising:
a routing table that stores switching information for switching the packet at each router apparatus positioned along a transfer path of the packet in the network up to the other network for each network address of the other network;
a switching information calculation device that uses a destination address of the packet received from the other network, searches the routing table, and obtains the switching information for switching the received packet at each router apparatus positioned along the transfer path of the received packet within the network; and
a transmitting device that affixes to the received packet the switching information obtained by the switching information calculation device in a transfer path order starting from a router apparatus subsequent to the edge router apparatus itself, and transfers the received packet to which the switching information has been affixed to a transfer destination router apparatus.

13. An edge router apparatus according to claim 12, comprising:
a data input apparatus for setting the switching information in the routing table.

14. A core router apparatus that receives and transfers a packet to which switching information has been affixed for switching the packet, wherein:
the core router apparatus switches the received packet based on the top piece of a plurality of pieces of switching information which are affixed to the received packet and are arranged in a transfer path order so as to correspond to router apparatuses which are arranged in a path from the core router apparatus itself to a network indicated by a destination address of the received packet, and the core router apparatus comprises a transmitting device that deletes the top piece of the switching information used by the core router apparatus itself so that the next piece of the switching information, which is to be used in the switching by a router apparatus which is adjacent to the core router apparatus itself, becomes the top piece of the switching information, and transmits the switched received packet to which the plurality of pieces of switching information other than the top piece of the switching information used by the core router apparatus itself are affixed.

15. A network system comprising:
an edge router apparatus that is disposed at a connection between a network and the outside of the network, receives a packet from the outside of the network and transfers the packet to a router apparatus within the network, or transmits a packet from a router within the network to the outside of the network; and
a core router apparatus that receives and transfers a packet to which switching information has been affixed for switching the packet; wherein:
the edge router apparatus comprises:
a switching information calculation device that obtains the switching information for switching the received packet at each router apparatus positioned along a transfer path of the received packet within the network based on a destination address of the packet received from the outside of the network; and
a first transmitting device that affixes to the received packet the switching information obtained by the switching information calculation device in a transfer path order starting from a router apparatus subsequent to the edge router apparatus itself, and transfers the received packet to which the switching information has been affixed to a transfer destination router apparatus; and
the core router apparatus comprises:
a second transmitting device that switches the received packet in the core router apparatus itself based on the switching information that has been affixed to the received packet in a transfer path order starting from the core router apparatus itself, and transmits a packet that has had the switching information used by the core router apparatus itself deleted.

16. A network system comprising:

an edge router apparatus that is disposed at a connection between a network and an another network, receives a packet from the other network and transfers the packet to a router apparatus within the network, or transmits a packet from a router apparatus within the network to the other network; and a core router apparatus that receives and transfers a packet to which switching information has been affixed for switching the packet; wherein:

the edge router apparatus comprises:

a routing table that stores switching information for switching the packet at each router apparatus positioned along a transfer path of the packet in the network up to the other network for each network address of the other network;

a switching information calculation device that uses a destination address of the packet received from the other network, searches the routing table, and obtains the switching information for switching the received packet at each router apparatus positioned along the transfer path of the received packet within the network; and a first transmitting device that affixes to the received packet the switching information obtained by the switching information calculation device in a transfer path order starting from a router apparatus subsequent to the edge router apparatus itself, and transfers the received packet to which the switching information has been affixed to a transfer destination router apparatus; and the core router apparatus comprises:

a second transmitting device that switches the received packet in the core router apparatus itself based on the switching information that has been affixed to the received packet in a transfer path order starting from the core router apparatus itself, and transmits a packet that has had the switching information used by the core router apparatus itself deleted.

17. A network system according to claim 16 wherein:

the edge router apparatus provides a data input apparatus for setting the switching information in the router table.

18. A network system according to claim 16, wherein:

the edge router apparatus comprises:

a first reporting device that reports a network address of the other network connected to the edge router apparatus itself and switching information to the other network to a core router apparatus or another edge router apparatus connected to the edge router apparatus itself as path information; and a creating device that receives the path information that has been reported from the core router apparatus or the other edge router apparatus connected to the core router apparatus itself, and creates the routing table based on the received path information; and the core router apparatus comprises:

a second reporting device that affixes switching information for an edge router apparatus or a core router apparatus that have transmitted the path information to the received path information, and reports the path information having affixed the switching information to core router apparatuses and edge router apparatuses other than the edge router apparatus and the core router apparatus that have transmitted the path information among core router apparatuses and edge router apparatuses that are connected to the core router apparatus itself.

* * * * *